US008200237B2

(12) United States Patent
Fukuoka et al.

(10) Patent No.: US 8,200,237 B2
(45) Date of Patent: *Jun. 12, 2012

(54) INTEGRATED CIRCUIT FOR CONTROLLING A PROCESS

(75) Inventors: Masaru Fukuoka, Miyagi (JP); Akihiko Nishio, Osaka (JP); Seigo Nakao, Osaka (JP); Alexander Golitschek Edler Von Elbwart, Langen (DE)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,942

(22) Filed: Oct. 12, 2011

(65) Prior Publication Data

US 2012/0026969 A1   Feb. 2, 2012

Related U.S. Application Data

(63) Continuation of application No. 12/983,770, filed on Jan. 3, 2011, now Pat. No. 8,064,919, which is a continuation of application No. 12/532,352, filed as application No. PCT/JP2008/000675 on Mar. 21, 2008, now Pat. No. 7,941,153.

(30) Foreign Application Priority Data

Mar. 23, 2007 (JP) ................................ 2007-077502
May 1, 2007 (JP) ................................ 2007-120853
Aug. 13, 2007 (JP) ................................ 2007-211104

(51) Int. Cl.
 *H04W 72/04* (2009.01)
(52) U.S. Cl. ...................... 455/450; 455/451; 455/452.1; 455/455; 455/434; 455/464; 370/330; 370/343; 370/347; 370/328; 370/329

(58) Field of Classification Search .................. 455/450, 455/445, 436, 452.2, 433–434; 370/343, 370/344, 329, 335, 522, 485
See application file for complete search history.

(56) References Cited

U.S. PATENT DOCUMENTS

| 6,993,339 | B2 |  | 1/2006 | Skillermark |  |
|---|---|---|---|---|---|
| 7,639,660 | B2 | * | 12/2009 | Kim et al. | 370/343 |
| 7,701,919 | B2 | * | 4/2010 | Ah Lee | 370/344 |
| 8,072,943 | B2 | * | 12/2011 | Khan et al. | 370/335 |

(Continued)

FOREIGN PATENT DOCUMENTS

JP   2007-074261   3/2007

(Continued)

OTHER PUBLICATIONS

International Search Report dated Jul. 1, 2008.

(Continued)

*Primary Examiner* — Nick Corsaro
*Assistant Examiner* — Michael Vu
(74) *Attorney, Agent, or Firm* — Dickinson Wright PLLC

(57) ABSTRACT

Provided is a radio communication base station device which can obtain a maximum frequency diversity effect of a downstream line control channel. The device includes: an RB allocation unit (101) which allocates upstream line resource blocks continuous on the frequency axis for respective radio communication mobile stations by the frequency scheduling and generates allocation information indicating which upstream line resource block has been allocated to which radio communication mobile station device; and an arrangement unit (109) which arranges a response signal to the radio communication mobile station device in the downstream line control channels distributed/arranged on the frequency axis while being correlated to the continuous upstream line resource blocks according to the allocation information.

20 Claims, 23 Drawing Sheets

U.S. PATENT DOCUMENTS

| | | | |
|---|---|---|---|
| 8,078,170 B2* | 12/2011 | Phan et al. | 455/436 |
| 2007/0171864 A1* | 7/2007 | Zhang et al. | 370/329 |
| 2008/0049851 A1 | 2/2008 | Nangia | |
| 2008/0293424 A1 | 11/2008 | Cho | |
| 2009/0185577 A1 | 7/2009 | Kishiyama | |
| 2010/0034165 A1 | 2/2010 | Han | |
| 2010/0165926 A1 | 7/2010 | Fukuoka | |

FOREIGN PATENT DOCUMENTS

| | | |
|---|---|---|
| WO | 2006/071049 | 7/2006 |
| WO | 2006/109436 | 10/2006 |
| WO | 2007/018154 | 2/2007 |

OTHER PUBLICATIONS

3GPP RAN WG1 Meeting document, "Assignment of Downlink ACK/NACK Channel," Panasonic, R1-070932, Feb. 2007, pp. 1-2.

3GPP RAN WG1 Meeting document, "ACK/NACK Channel Transmission in E-UTRA Downlink," R1-070734, Feb. 2007, pp. 1-9.

Japanese Office Action dated Jul. 20, 2010.

3GPP RAN WG1 Meeting #47, "ACK/NACK Signal Structure in E-UTRA Downlink," NTT DoCoMo, et al., R1-063326, Nov. 2006, pp. 1-3.

3GPP RAN WG1 Meeting #48, "Control Channel Structure for EUTRA Downlink," Samsung, R1-070959, Feb. 2007, pp. 1-3.

N. Miki, et al., "Investigation on Optimum Channel Coding Scheme of L1/L2 Control Signaling Bits in Evolved UTRA Downlink," Proceedings of IEICE General Conference, B-5-61, Mar. 2007, p. 475.

N. Miki, et al., "Investigation on Multiplexing Methods of L1/L2 Control Signaling Bits in Time and Frequency Domain for Evolved UTRA Downlink," Proceedings of IEICE General Conference, B-5-62, Mar. 2007, p. 476.

* cited by examiner

| UPLINK RB | DOWNLINK CONTROL CHANNEL |
|---|---|
| RB#1 | CH#1 |
| RB#2 | CH#2 |
| RB#3 | CH#3 |
| RB#4 | CH#4 |
| RB#5 | CH#5 |
| RB#6 | CH#6 |
| RB#7 | CH#7 |
| RB#8 | CH#8 |

FIG.3

| DOWNLINK CCE | DOWNLINK CONTROL CHANNEL |
|---|---|
| CCE#1 | CH#1 |
| CCE#2 | CH#2 |
| CCE#3 | CH#3 |
| CCE#4 | CH#4 |
| CCE#5 | CH#5 |
| CCE#6 | CH#6 |
| CCE#7 | CH#7 |
| CCE#8 | CH#8 |

INTEGRATED CIRCUIT FOR CONTROLLING A PROCESS

This is a continuation application of application Ser. No. 12/983,770 filed Jan. 3, 2011, which is a continuation application of application Ser. No. 12/532,352 filed Sep. 21, 2009, which is a national stage of PCT/JP2008/000675 filed Mar. 21, 2008, which is based on Japanese Application No. 2007-077502 filed Mar. 23, 2007; Japanese Application No. 2007-120853 filed May 1, 2007; and Japanese Application No. 2007-211104 filed Aug. 13, 2007, the entire contents of each which are incorporated by reference herein.

TECHNICAL FIELD

The present invention relates to a radio communication base station apparatus and control channel mapping method.

BACKGROUND ART

In mobile communication, ARQ (Automatic Repeat reQuest) is applied to uplink data transmitted from a radio communication mobile station apparatus (hereinafter simply "mobile station") to a radio communication base station apparatus (hereinafter simply "base station") in uplink, and a response signal showing uplink data error detection result is fed back to the mobile station in downlink. The base station performs a CRC (Cyclic Redundancy Check) for the uplink data, and, if CRC=OK (no error), an ACK (Acknowledgment) signal is fed back, and, if CRC=NG (error), a NACK (Negative Acknowledgment) signal is fed back as a response signal to the mobile station.

To use downlink communication resources efficiently, studies are conducted recently about ARQ, which associates uplink resource blocks (RBs) for transmitting uplink data and downlink control channels for transmitting response signals in downlink (e.g. see Non-patent Document 1). By this means, a mobile station is able to identify control channels in which a response signal is transmitted to the mobile station according to RB allocation information reported from the base station even when allocation information about the control channel is not reported separately.

Further, studies are conduct for ARQ recently whereby a response signal is spread and the spread response signal is duplicated in order to average interference of the response signal from neighboring cells or sectors and provide frequency diversity gain for the response signal (e.g. see Non-patent Document 2).

Non-patent Document 1: 3GPP RAN WG1 Meeting document, R1-070932, "Assignment of Downlink ACK/NACK Channel," Panasonic, February 2007

Non-patent Document 2: 3GPP RAN WG1 Meeting document, R1-070734, "ACK/NACK Channel Transmission in E-UTRA Downlink," TI, February 2007

DISCLOSURE OF INVENTION

Problems to be Solved by the Invention

It is possible to use the above ARQs studied recently by combining them. Now, a specific example to map response signals to downlink control channels will be explained. With the following explanation, a base station receives uplink data transmitted from mobile stations using uplink RB #1 to RB #8 shown in FIG. 1, and the base station maps response signals to uplink data (ACK signals and NACK signals) to downlink control channels CH #1 to CH #8, mapped in four frequency bands, subcarriers f1 to f4, f9 to f12, f17 to f20 and f25 to f28 shown in FIG. 2, and transmits the response signals to the mobile stations. Further, the base station spreads a response signal with spreading code having spreading factor 4, and repeats the spread response signal with repetition factor 2. Therefore, as shown in FIG. 2, downlink control channels CH #1 to CH #4 are mapped to identical bands, subcarriers f1 to f4 and f17 to f20 in a localized manner, and downlink control channels CH #5 to CH #8 are mapped to identical bands, subcarriers f9 to f12 and f25 to f28 in a localized manner.

Further, as shown in FIG. 3, the uplink RBs shown in FIG. 1 and the downlink control channels shown in FIG. 2 are associated one by one. Therefore, as shown in FIG. 3, a response signal to uplink data transmitted using RB #1 shown in FIG. 1 is mapped to downlink control channel CH #1, that is, mapped to subcarriers f1 to f4 and f17 to f20 shown in FIG. 2. Likewise, as shown in FIG. 3, a response signal to uplink data transmitted using RB #2 shown in FIG. 1 is mapped to downlink control channel CH #2, that is, mapped to subcarriers f1 to f4 and f17 to f20 shown in FIG. 2. The same applies to RB #3 to RB #8.

Further, when a coding block is formed with a plurality of consecutive RBs on the frequency domain and RBs are allocated in one-block units, the base station transmits response signals to mobile stations by mapping response signals to a plurality of downlink control channels in association with a plurality of uplink RBs included in one coding block. For example, when one coding block is formed with three consecutive uplink RBs, RB #1 to RB #3, amongst uplink RB #1 to RB #8 shown in FIG. 1, the base station maps code-multiplexed spread response signals to downlink control channels CH #1 to CH #3 mapped in a localized manner in identical bands, subcarriers f1 to f4 and f17 to f20 shown in FIG. 2.

Although downlink control channels CH #1 to CH #8 are mapped to sixteen subcarriers, subcarriers f1 to f4, f9 to f12, f17 to f20 and f25 to f28 in this way, with the above example, response signals are mapped only to eight subcarriers, subcarriers f1 to f4 and f17 to f20. That is, with the above example, response signals are only mapped to half of all subcarriers to which downlink control channels are mapped.

In the case where downlink control channels mapped in the limited frequency domain are used in this way, little frequency diversity effect may be obtained depending upon the positions to which downlink control channels are mapped.

It is therefore an object of the present invention to provide a base station and control channel mapping method that can maximize the frequency diversity effect on downlink control channels.

Means for Solving the Problems

The base station of the present invention adopts a configuration including: an allocation section that allocates a first control channel formed with a plurality of consecutive RBs or a plurality of CCEs to a radio communication mobile station apparatus; and a mapping section that maps control signals for the radio communication mobile station apparatus to a plurality of second control channels mapped in a distributed manner on a frequency domain in association with the plurality of RBs or the plurality of CCEs.

Advantageous Effect of the Invention

According to the present invention, it is possible to maximize the frequency diversity effect on downlink control channels.

BRIEF DESCRIPTION OF DRAWINGS

FIG. 3 shows the associations between uplink RBs and downlink control channels;

FIG. 11 shows the associations between downlink CCEs and downlink control channels according to Embodiment 4 of the present invention;

FIG. 14 shows the associations (variations) between SCCHs and downlink CCEs, according to Embodiment 4 of the present invention;

BEST MODE FOR CARRYING OUT THE INVENTION

Now, embodiments of the present invention will be described in detail with reference to the accompanying drawings. The base station according to the present embodiment of the present invention transmits a response signal using the OFDM scheme. Further, the mobile station according to the present embodiment transmits uplink data by DFTs-FDMA (Discrete Fourier Transform spread Frequency Division Multiple Access). When uplink data is transmitted by DFTs-FDMA, as described above, a coding block is formed with a plurality of consecutive RBs on the frequency axis (in the frequency domain), and the base station allocates RBs to mobile stations in one-block units.

Embodiment 1

Figure 4:
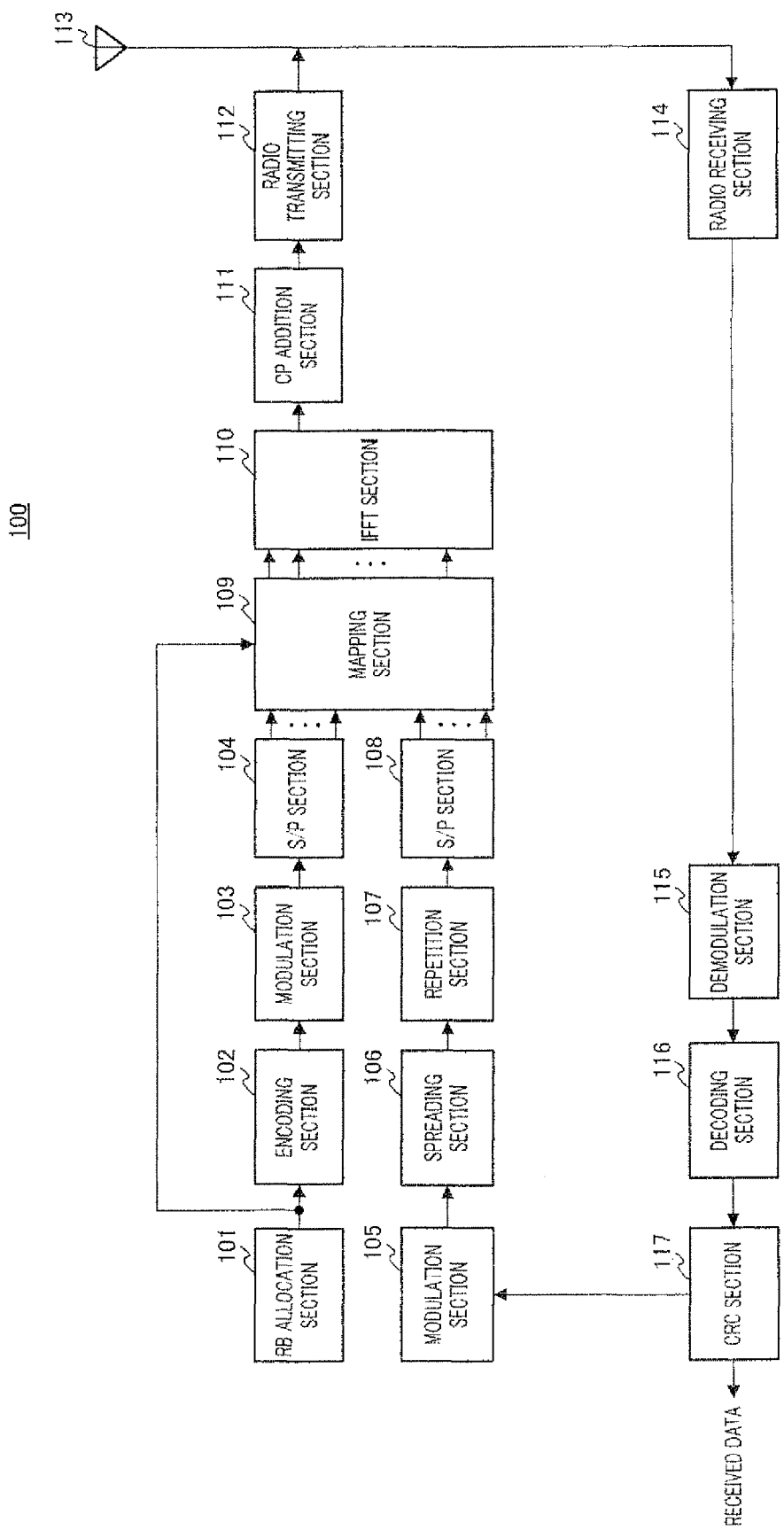
FIG. 4 is a block diagram showing the configuration of the base station according to Embodiment 1 of the present invention.
Figure 5:
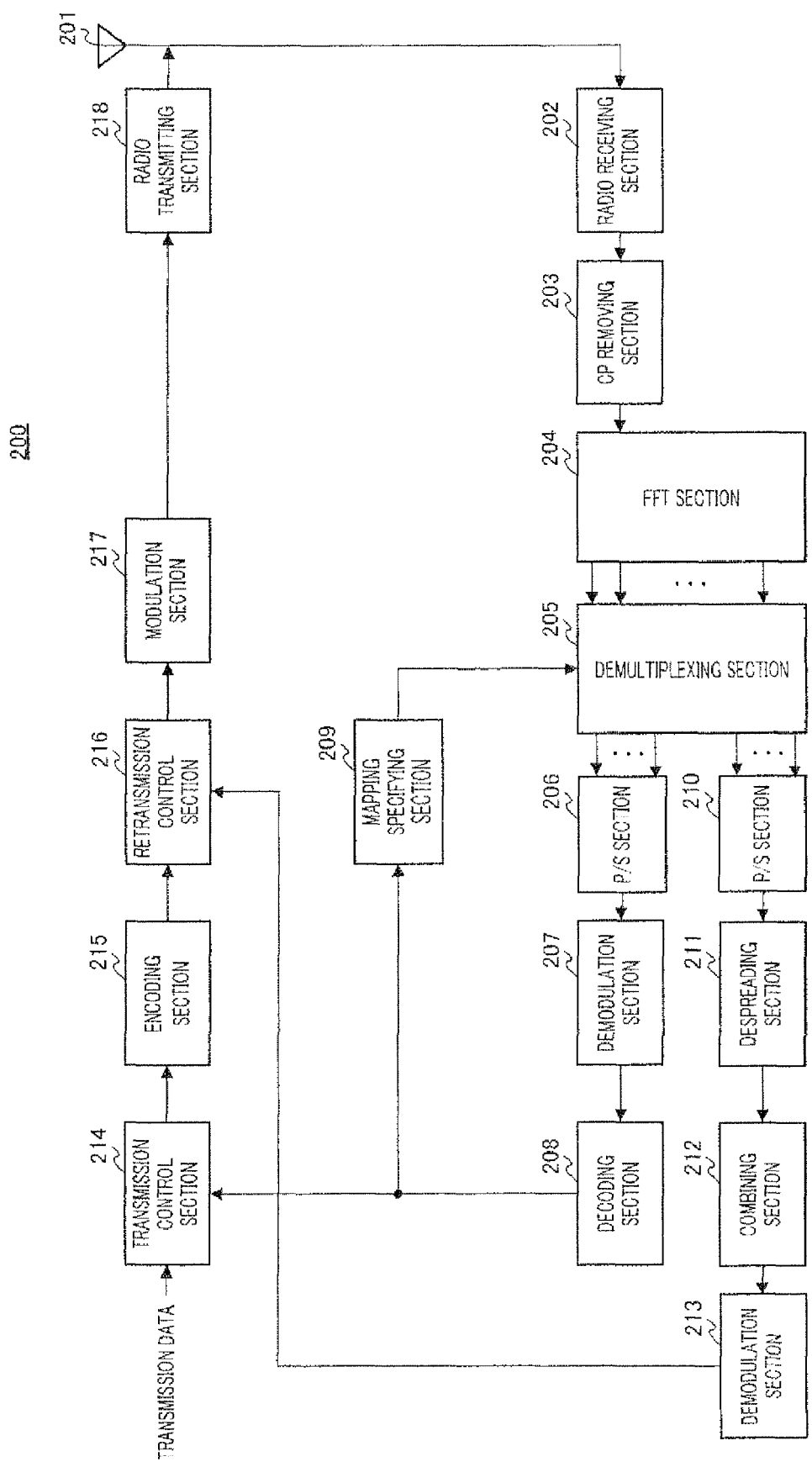
FIG. 5 is a block diagram showing the configuration of the mobile station according to Embodiment 1 of the present invention.

FIG. 4 shows the configuration of base station 100 according to the present embodiment, and FIG. 5 shows the configuration of mobile station 200 according to the present embodiment.

To avoid complex explanation, FIG. 4 shows components that pertain to uplink data reception and downlink transmission of response signals to uplink data, which the present invention closely relates to, and drawings and explanations of components that pertain to downlink data transmission are omitted. Similarly, FIG. 5 shows components that pertain to uplink data transmission and downlink reception of response signals to uplink data, which the present invention closely relates to, and drawings and explanations of components that pertain to downlink data reception are omitted.

In base station 100 in FIG. 4, RB allocation section 101 allocates uplink RBs to mobile stations by frequency scheduling and generates RB allocation information showing which uplink RBs are allocated to which mobile stations (i.e. allocation information showing RB allocation results), and outputs the generated RB allocation information to encoding section 102 and mapping section 109. Further, RB allocation section 101 allocates RBs using a plurality of consecutive RBs included in one coding block, as one unit. An RB is formed by grouping into a block a number of subcarriers neighboring each other at intervals of coherence bandwidth.

Encoding section 102 encodes the RB allocation information, and outputs the encoded RB allocation information to modulation section 103.

Modulation section 103 modulates the encoded RB allocation information, to generate RB allocation information symbols, and outputs the RB allocation information symbols to S/P section (serial-to-parallel conversion section) 104.

S/P section 104 converts the RB allocation information symbols received as input from modulation section 103 in series into parallel RB allocation information symbols, and outputs the parallel RB allocation information symbols to mapping section 109.

Modulation section 105 modulates a response signal received as input from CRC section 117 and outputs the modulated response signal to spreading section 106.

Spreading section 106 spreads the response signal received as input from modulation section 105 and outputs the spread response signal to repetition section 107.

Repetition section 107 duplicates (repeats) the response signal received as input from spreading section 106 and outputs a plurality of response signals including identical response signals, to S/P section 108.

S/P section 108 converts the response signals received as input from repetition section 107 in series into parallel response signals, and outputs the parallel response signals to mapping section 109.

Mapping section 109 maps the RB allocation information symbols and response signals to a plurality of subcarriers forming an OFDM symbol, and outputs the mapped RB allocation information symbols and response signals to IFFT (Inverse Fast Fourier Transform) section 110. Here, based on the RB allocation information received as input from RB allocation section 101, mapping section 109 maps the response signals to downlink control channels mapped on the frequency domain in association with uplink RBs. For example, when mapping section 109 receives RB #1 to RB #3 shown in FIG. 1 from RB allocation section 101 as RB allocation information for mobile station 200, as shown in FIG. 3, mapping section 109 maps response signals to uplink data transmitted from mobile station 200 using RB #1 to RB #3, to downlink control channels CH #1 to CH #3. The mapping processing in mapping section 109 will be described later in detail.

IFFT section 110 performs an IFFT on the RB allocation information symbols and response signals mapped to a plurality of subcarriers, to generate an OFDM symbol, and outputs the generated. OFDM symbol to CP (Cyclic Prefix) addition section 111.

CP addition section 111 adds the same signal as the tail part of the OFDM symbol, as a CP, to the head of the OFDM symbol.

Radio transmitting section 112 performs transmitting processing including D/A conversion, amplification and up-conversion, on the OFDM symbol with a CP, and transmits the OFDM symbol with a CP after transmitting processing, from antenna 113, to mobile station 200.

Meanwhile, radio receiving section 114 receives uplink data transmitted from mobile station 200 via antenna 113, and performs receiving processing including down-conversion and A/D conversion for this uplink data.

Demodulation section 115 demodulates the uplink data and outputs the demodulated uplink data to decoding section 116.

Decoding section 116 decodes the demodulated uplink data, and outputs the decoded uplink data to CRC section 117.

CRC section 117 performs error detection for the uplink data after the decoding using CRC, to generate, as a response signal, an ACK signal if CRC=OK (no error) or a NACK signal if CRC=NG (error), and outputs the generated response signal to modulation section 105. Further, if CRC=OK (no error), CRC section 117 outputs the uplink data after decoding as received data.

Meanwhile, in mobile station 200 shown in FIG. 5, radio receiving section 202 receives an OFDM symbol transmitted from base station 100 via antenna 201, and performs receiving processing including down-conversion and A/D conversion on this OFDM symbol.

CP removing section 203 removes the CP from the OFDM symbol after receiving processing.

FFT (Fast Fourier Transform) section 204 performs an FFT on the OFDM symbol after CP removal, to acquire RB allocation information symbols and response signals, and outputs them to demultiplexing section 205.

Demultiplexing section 205 demultiplexes the input signals into the RB allocation information symbols and the response signals, and outputs the RB allocation information symbols to P/S section 206 and the response signals to P/S section 210. Here, based on the specified result received as input from mapping specifying section 209, demultiplexing section 205 demultiplexes response signals from the input signal.

P/S section 206 converts a plurality of parallel RB allocation information symbols received as input from demultiplexing section 205 into RB allocation information symbols in series, and outputs the RB allocation information symbols in series to demodulation section 207.

Demodulation section 207 demodulates the RB allocation information symbols, and outputs the demodulated RB allocation information to decoding section 208.

Decoding section 208 decodes the demodulated RB allocation information, and outputs the decoded RB allocation information to transmission control section 214 and mapping specifying section 209.

Based on the RB allocation information received as input from decoding section 208, mapping specifying section 209 specifies downlink control channels to which response signals to uplink data transmitted from the mobile station are mapped. For example, when the RB allocation information for a mobile station is RB #1 to RB #3 shown in FIG. 1, as shown in FIG. 3, mapping specifying section 209 specifies CH #1 to CH #3 to be downlink control channels for the mobile station to which the response signals are mapped. Then mapping specifying section 209 outputs the specified result to demultiplexing section 205. The specifying processing in mapping specifying section 209 will be described later in detail.

P/S section 210 converts the parallel response signals received as input from demultiplexing section 205 into in series, and outputs the response signals in series to despreading section 211.

Despreading section 211 despreads the responses signals, and outputs the despread response signals to combining section 212.

In the despread response signals, combining section 212 combines the original response signal and the response signals generated by repeating the original response signal, and outputs the response signal after the combining to demodulation section 213.

Demodulation section 213 demodulates the response signal after combining, and outputs the demodulated response signal to retransmission control section 216.

When RB allocation information received as input from decoding section 208 shows that uplink RBs are allocated to the subject mobile station, transmission control section 214 maps the transmission data to the RBs designated in the RB allocation information, and outputs the mapped transmission data to encoding section 215.

Encoding section 215 encodes the transmission data, and outputs the encoded transmission data to retransmission control section 216.

Upon initial transmission, retransmission control section 216 holds the encoded transmission data and outputs it to modulation section 217. Retransmission control section 216 holds the transmission data until retransmission control section 216 receives an ACK signal from demodulation section 213. Further, when a NACK signal is received as input from demodulation section 213, that is, upon retransmission, retransmission control section 216 outputs the transmission data that is held, to modulation section 217.

Modulation section 217 modulates the encoded transmission data, received as input from retransmission control section 216, and outputs the modulated transmission data to radio transmitting section 218.

Radio transmitting section 218 performs transmitting processing including D/A conversion, amplification and up-conversion on the modulated transmission data, and transmits the transmission data after transmitting processing from antenna 201 to base station 100. The data transmitted in this way becomes uplink data.

Next, the mapping processing in mapping section 109 in base station 100 and the specifying processing in mapping specifying section 209 in mobile station 200 will be explained in detail.

Figure 1:
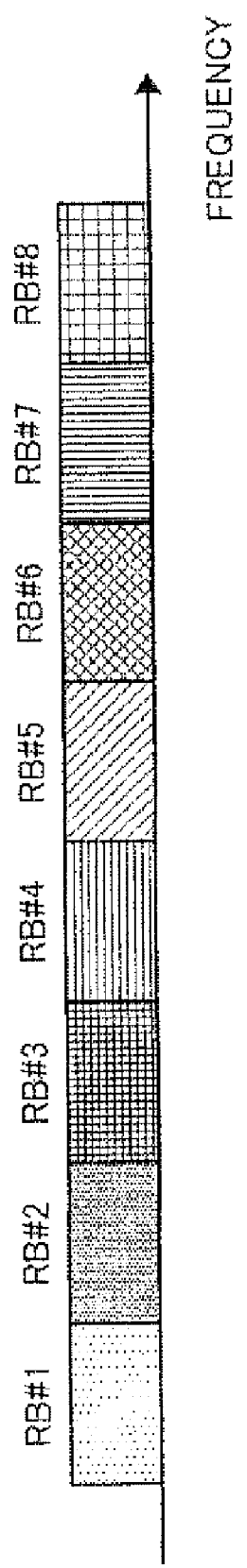
FIG. 1 illustrates an uplink RB mapping example.
Figure 6:
FIG. 6 illustrates the downlink control channel mapping according to Embodiment 1 of the present invention.

With the present embodiment, base station 100 receives uplink data transmitted from mobile station 200 using RB #1 to RB #8 shown in FIG. 1, and base station 100 maps response signals to uplink data (ACK signals and NACK signals) to CH #1 to CH #8, mapped in four frequency bands, subcarriers f1 to f4, f9 to f12, f17 to f20 and f25 to f28 shown in FIG. 6, and transmits the response signals to mobile station 200. Further, similar to FIG. 2, spreading section 106 in base station 100 spreads the response signal with spreading code having spreading factor 4, and repetition section 107 repeats the spread response signal with repetition factor 2. Further, as shown in FIG. 3, the uplink RBs shown in FIG. 1 and the downlink control channels shown in FIG. 6 are associated one by one.

Mapping section 109 maps response signals for mobile station 200 to a plurality of downlink control channels that are associated with a plurality of RBs and that are subject to distributed mapping on the frequency domain. Mapping section 109 holds association information between uplink RBs and downlink control channels in FIG. 3, and the downlink control channel mapping information shown in FIG. 6, and, based on these, maps the response signals to subcarriers to which downlink control channels are mapped.

To be more specific, when the RB allocation information for mobile station 200 designates RB #1 to RB #3, mapping section 109 maps the response signals to CH #1 associated with RB #1 in FIG. 3, that is, maps the response signals to subcarriers f1 to f4 and f17 to f20 shown in FIG. 6. Likewise, mapping section 109 maps the response signals to CH #2 associated with RB #2, that is, maps the response signals to subcarriers f9 to f12 and subcarriers f25 to f28, and maps the response signals to CH #3 associated with RB #3, that is, maps the response signals to subcarriers f1 to f4 and subcarriers f17 to f20.

Here, in the downlink control channel mapping shown in FIG. 6, downlink control channels (e.g. CH #1 and CH #2) associated with the two consecutive uplink RBs in FIG. 1 (e.g. RB #1 and RB #2) are mapped to different frequency bands in a distributed manner. In other words, the downlink control channels mapped in a localized manner in identical bands in FIG. 6 correspond to a plurality of nonconsecutive uplink RBs at two-RB intervals in FIG. 1. To be more specific, for example, downlink control channels mapped to subcarriers f1 to f4 shown in FIG. 6 in a localized manner are downlink control channels CH #1, CH #3, CH #5 and CH #7, and the uplink RBs associated with those downlink control channels are nonconsecutive RBs at two-RB intervals, RB #1, RB #3, RB #5 and RB #7, as shown in FIG. 3.

Consequently, when base station 100 transmits response signals to uplink data transmitted from mobile station 200, using a plurality of consecutive uplink RBs, it is possible to prevent response signals from being mapped concentrated in identical bands. That is, base station 100 is able to map response signals over a plurality of frequency bands in a distributed manner, to transmit the response signals subject to distributed mapping. For example, as described above, when the RB allocation information for mobile station 200 designates RB #1 to RB #3, mapping section 109 maps the response signals to subcarriers f1 to f4 and f17 to f20 shown in FIG. 6, the response signals to subcarriers f9 to f12 and f25 to f28, and, the response signals to subcarriers f1 to f4 and f17 to f20. By this means, the response signals are mapped to all subcarriers f1 to f4, f9 to f12, f17 to f20 and f25 to f28 uniformly in a distributed manner to which downlink control channels are mapped In this way, mapping section 109 maps response signals to downlink control channels based on the associations between uplink RBs and downlink control channels shown in FIG. 3 and the downlink control channel mapping shown in FIG. 6, so that radio transmitting section 112 in base station 100 is able to transmit response signals to mobile station 200 using downlink control channels that are associated with uplink RBs and that are mapped in a distributed manner on the frequency domain.

Likewise, mapping specifying section 209 in mobile station 200 (FIG. 5) holds the association information between uplink RBs and downlink control channels shown in FIG. 3 and the downlink control channel mapping information shown in FIG. 6, and specifies the downlink control channels to which response signals for the mobile station are mapped, from the RB allocation information received. To be more specific, when mapping specifying section 209 receives as input RB allocation information showing that RB #1 to RB #3 shown in FIG. 1 are allocated to a mobile station from decoding section 208, based on the associations shown in FIG. 3, mapping specifying section 209 specifies that the response signals for the mobile station are mapped to subcarriers f1 to f4 and f17 to f20, to which downlink control channels CH #1 and CH #3 are mapped, and to subcarriers f9 to f12 and f25 to f28, to which downlink control channel CH #2 is mapped, as shown in FIG. 6.

In this way, according to the present embodiment, it is less likely that response signals to uplink data, which are transmitted using a plurality of consecutive uplink RBs, concentrate in identical frequency bands and code-multiplexed, so that it is possible to map response signals in a distributed manner on the frequency domain. Therefore, according to the present embodiment, it is possible to maximize the frequency diversity effect on downlink control channels.

Embodiment 2

By mapping spread blocks generated by spreading response signals to consecutive subcarriers (e.g. subcarriers f1 to f4 shown in FIG. 6) as in Embodiment 1, intersymbol interference (ISI) that is caused between neighboring subcarriers decreases to an extent ISI can be ignored.

However, if base station 100 controls transmission power on a per downlink control channel basis, it is no longer possible to ignore ISI because transmission power varies between a plurality of downlink control channels mapped in identical frequency bands and ISI from a downlink control channel of greater transmission power to a downlink control channel of smaller transmission power increases. For example, focusing upon downlink control channels CH #1 and CH #3 shown in FIG. 6, if the transmission power for downlink control channel CH #1 is greater than transmission power for downlink control channel CH #3, downlink control channels CH #1 and CH #3 are mapped to identical frequency bands, subcarriers f1 to f4 and f17 to f20, and therefore ISI from downlink control channel CH #1 to downlink control channel CH #3 is caused in both frequency bands.

Then, mapping section 109 according to the present embodiment, maps response signals to a plurality of downlink control channels in different mapping patterns in a distributed manner on the frequency domain.

Figure 7:
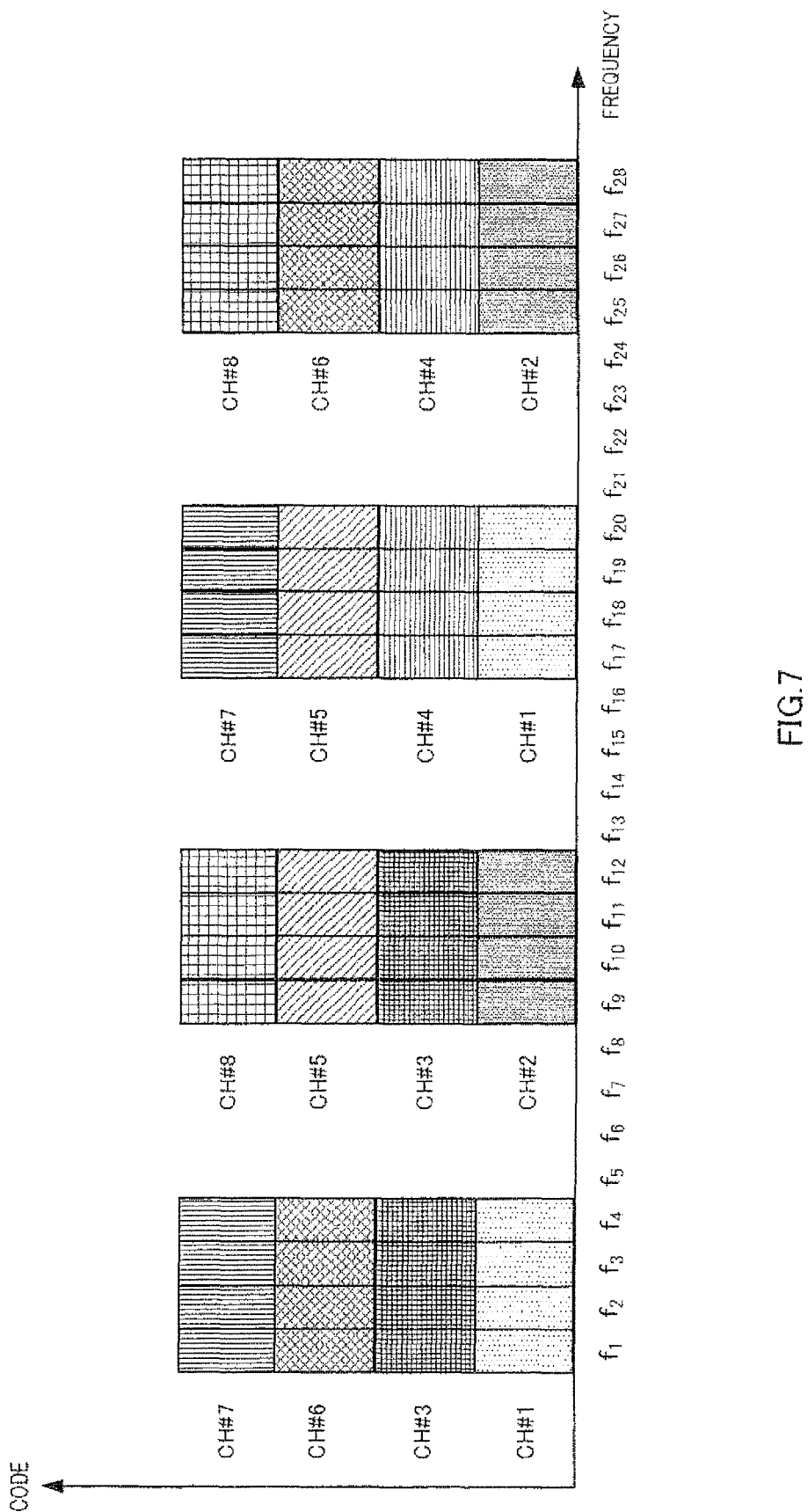
FIG. 7 illustrates the downlink control channel mapping according to Embodiment 2 of the present invention.

That is, in FIG. 6, downlink control channels CH #1 and CH #3 are mapped to subcarriers f1 to f4 and f17 to f20 in identical mapping patterns. By contrast with this, with the present embodiment, as shown in FIG. 7, the mapping pattern of downlink control channel CH #1 and the mapping pattern in downlink control channel CH #3 vary, and, downlink control channel CH #1 is mapped to subcarriers f1 to f4 and f17 to f20 and downlink control channel CH #3 is mapped to subcarriers f1 to f4 and f9 to f12. That is, with the present embodiment, as shown in FIG. 7, downlink control channels CH #1 and CH #3 are mapped to identical subcarriers f1 to f4, and meanwhile, downlink control channel CH #1 is mapped to subcarriers f17 to f20 and downlink control channel CH #3 is mapped to subcarriers f9 to f12. That is, CH #1 and CH #3 are mapped in different mapping patterns in a distributed manner on the frequency domain.

By this means, similar to Embodiment 1, when mapping section 109 maps response signals to uplink data transmitted using RB #1 to RB #3, to downlink control channels CH #1 to CH #3, ISI is not caused in the both frequency bands, subcarriers f9 to f12 and subcarriers f17 to f20 though ISI is caused in subcarriers f1 to f4 between downlink control channel CH #1 of greater transmission power and downlink control channel CH #3 of smaller transmission power.

In this way, according to the present embodiment, it is possible to provide the same advantage as in Embodiment 1, and it is possible to reduce ISI by randomizing ISI caused by transmission power control.

By mapping downlink control channels CH #1 to CH #8 on a random basis on the frequency domain, it is possible to map downlink control channels CH #1 to CH #8 in different mapping patterns in a distributed manner on the frequency domain.

Embodiment 3

With the present embodiment, response signals are mapped to a plurality of downlink control channels adopting different mapping patterns between neighboring cells.

Figure 8:
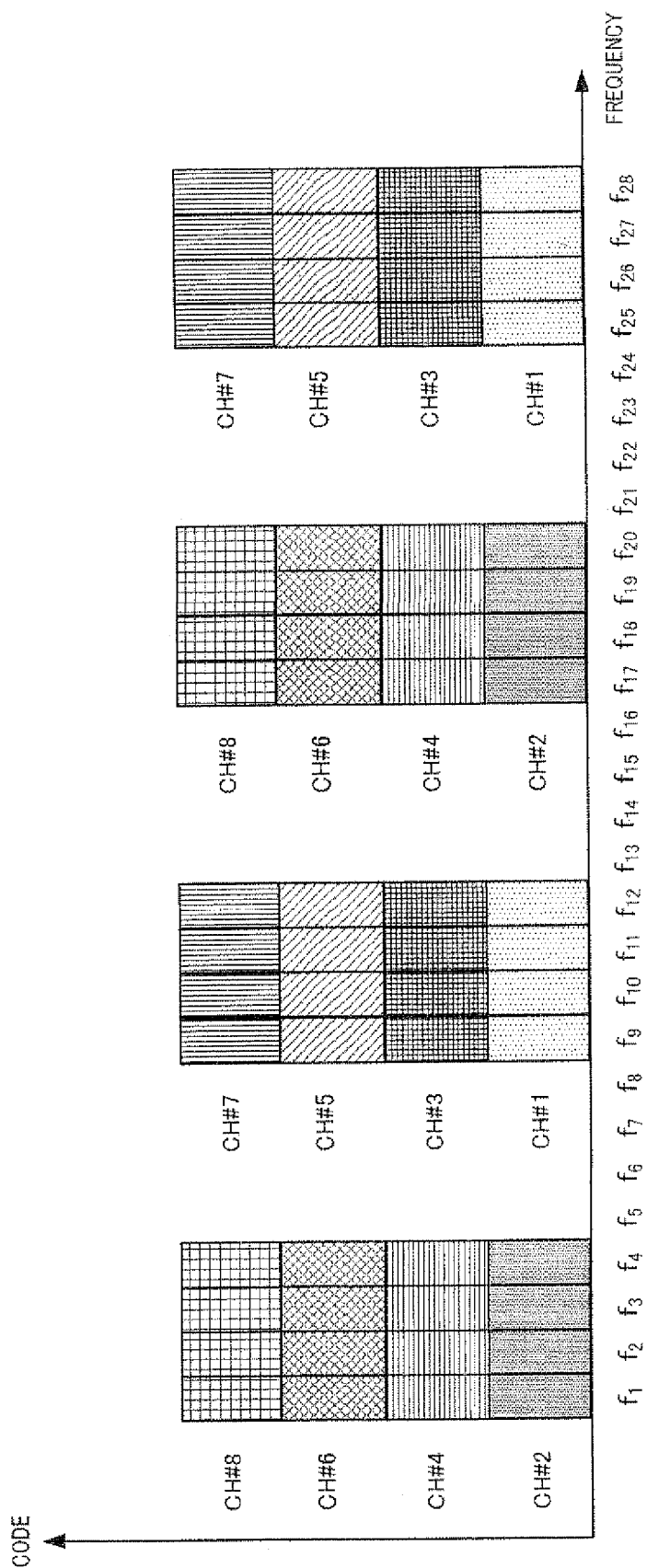
FIG. 8 illustrates the downlink control channel mapping in cell 2, according to Embodiment 3 of the present invention.

Here, a case will be explained where a cell neighboring cell 1 is one cell, cell 2. Further, cell 1 and cell 2 are synchronized. Further, when FIG. 6 shows a downlink control channel mapping pattern in cell 1, FIG. 8 shows a downlink control channel mapping pattern in cell 2. Further, similar to Embodiment 1, the downlink control channels shown in FIG. 8 are mapped in a distributed manner on the frequency domain in association with a plurality of consecutive uplink RBs.

The downlink control channels mapped in identical frequency bands vary between the mapping pattern in cell 1 (FIG. 6) and the mapping pattern in cell 2 (FIG. 8). That is, the identical downlink control channels are mapped to different frequency bands in a distributed manner in cell 1 and cell 2.

To be more specific, in cell 1, as shown in FIG. 6, downlink control channels CH #1, CH #3, CH #5 and CH #7 are mapped to subcarriers f1 to f4 and f17 to f20, and downlink control channels CH #2, CH #4, CH #6 and CH #8 are mapped to subcarriers f9 to f12 and f25 to f28. By contrast with this, in cell 2, as shown in FIG. 8, downlink control channels CH #2, CH #4, CH #6 and CH #8 are mapped to subcarriers f1 to f4 and f17 to f20, and downlink control channels CH #1, CH #3, CH #5 and CH #7 are mapped to subcarriers f9 to f12 and f25 to f28.

In this way, according to the present embodiment, mapping patterns of downlink control channels CH #1 to CH #8 on the frequency domain are made different between neighboring cells. Therefore, according to the present embodiment, it is possible to provide the same advantage as in Embodiment 1 in the same cell, and, when response signals are transmitted at the same time in neighboring cells, it is possible to reduce inter-cell interference by randomizing inter-cell interference from neighboring cells between downlink control channels.

Although a case has been explained above with the present embodiment where the present invention is implemented between neighboring cells, the present invention may also be implemented between neighboring sectors in the same cell. That is, in the above explanation, by regarding cell 1 as sector 1 and cell 2 as sector 2, the present invention may also be implemented between neighboring sectors. Further, it is not necessary to take into consideration of the synchronization between neighboring sectors, so that the present invention may be implemented easier between neighboring sectors than between neighboring cells.

Further, although a case has been explained above with an example where the number of cells is two, the present invention may also be implemented where the number of cells is three or more.

Embodiment 4

With the present embodiment, a case will be explained where CCEs (Control Channel Elements) and downlink control channels for transmitting response signals in downlink, are associated.

Control information that is required to transmit uplink data from a mobile station to a base station (e.g. the above-described RB allocation information) is transmitted from the base station to the mobile station using a different downlink control channel from the downlink control channel for transmitting response signals (e.g. an SCCH (Shared Control Channel)).

Further, the base station allocates a plurality of SCCHs to mobile stations and transmits SCCH allocation information showing which SCCHs in a plurality of SCCHs are assigned to which mobile stations (i.e. allocation information showing SCCH allocation results), to the mobile stations before transmitting the RB allocation information.

Further, each SCCH is formed with one CCE or a plurality of CCEs. For example, SCCH #1 to SCCH #8 adopt the configurations shown in FIG. 9. That is, SCCH #1 is formed with CCE #1 and CCE #2, SCCH #2 is formed with CCE #3 and CCE #4, SCCH #3 is formed with CCE #5 and CCE #6, SCCH #4 is formed with CCE #7 and CCE #8, SCCH #5 is formed with CCE #1 to CCE #4, and SCCH #6 is formed with CCE #5 to CCE #8. In this way, when one SCCH is formed with a plurality of CCEs, one SCCH is formed with a plurality of consecutive CCEs.

Figure 10:
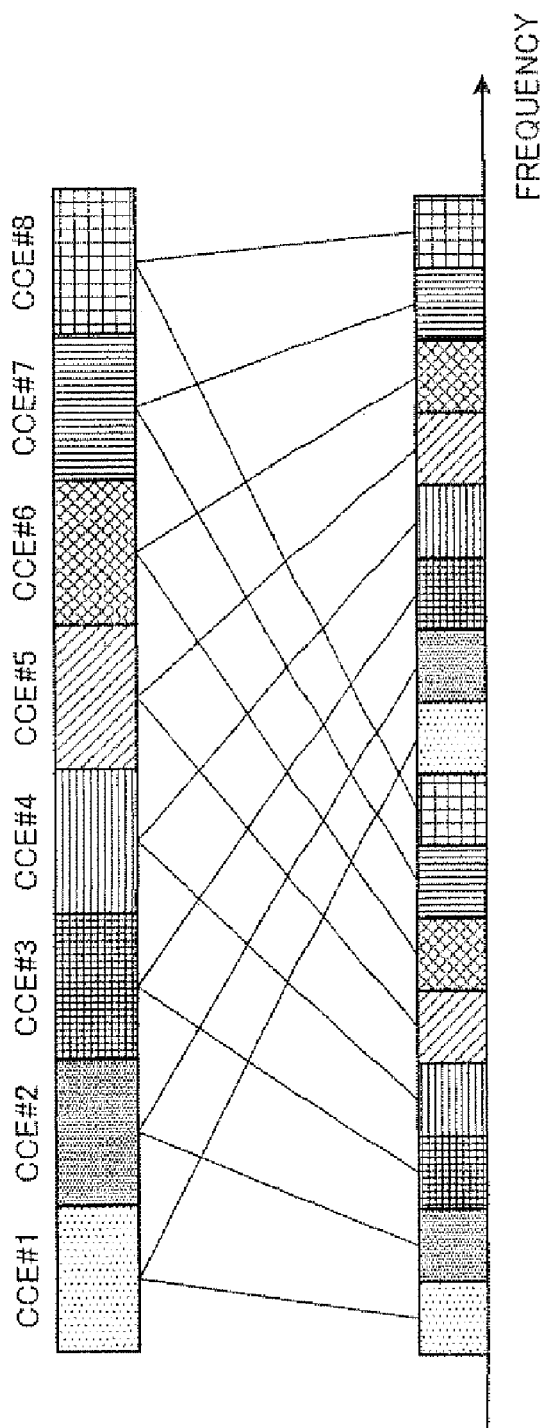
FIG. 10 illustrates the downlink CCE mapping example according to Embodiment 4 of the present invention.

CCE #1 to CCE #8 and physical resources on the frequency axis (in the frequency domain) are associated as shown in FIG. 10, for example. That is, one CCE is associated with a plurality of physical resources mapped on the frequency domain in a distributed manner.

Figure 2:
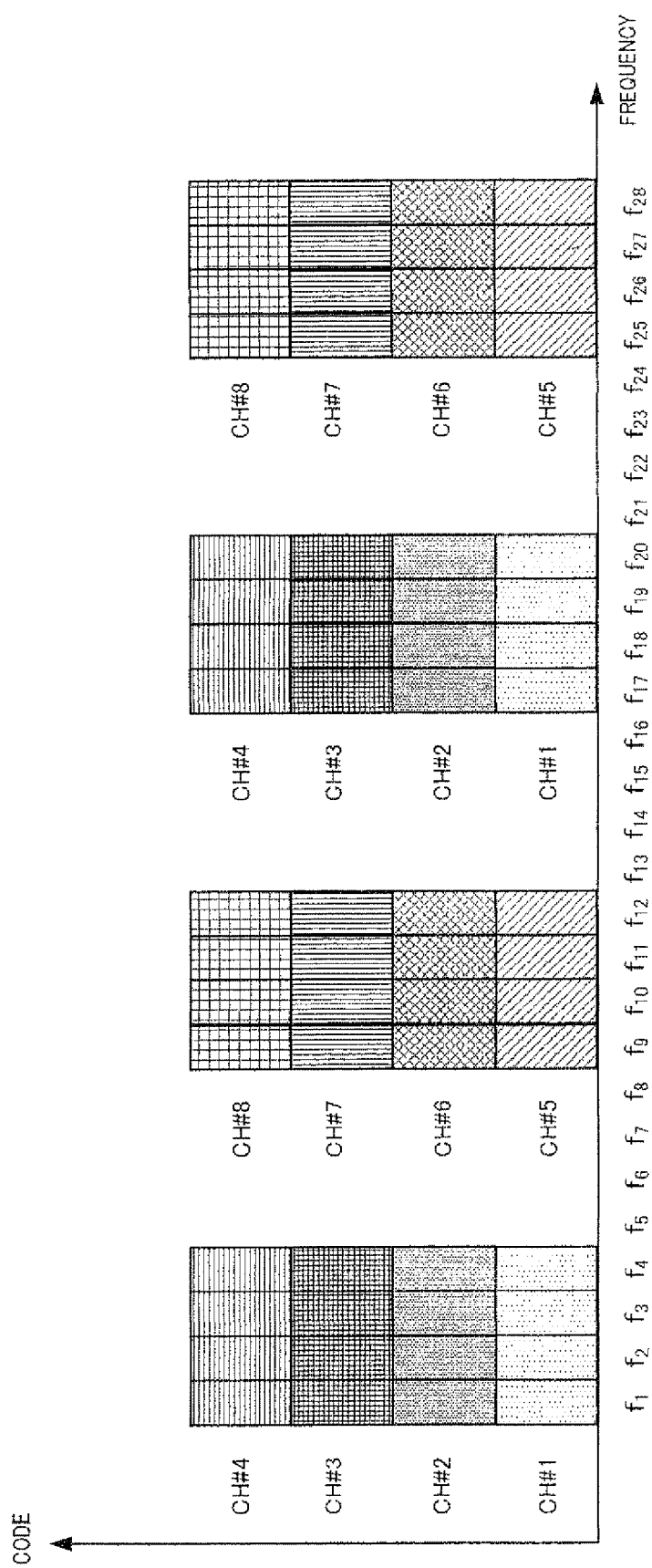
FIG. 2 illustrates a mapping example of downlink control channels.
Figure 9:
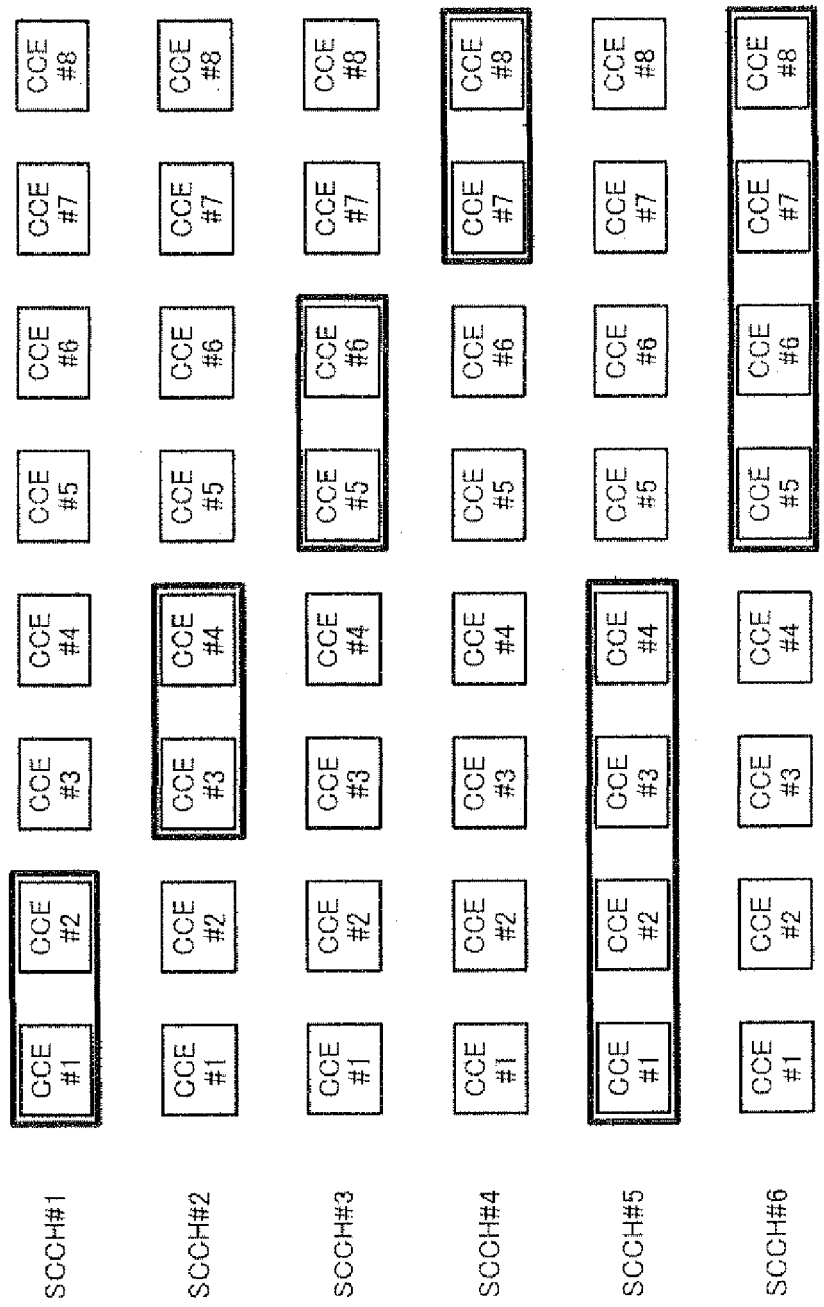
FIG. 9 shows the associations between SCCHs and downlink CCEs according to Embodiment 4 of the present invention.

Here, to use downlink communication resources efficiently, it is one possibility to associate CCEs and downlink control channels for transmitting response signals in downlink, and identify the control channels in which response signals are transmitted to a mobile station based on SCCH allocation information the base station reports to the mobile station. For example, as shown in FIG. 11, the CCEs shown in FIG. 9 and the downlink control channels shown in FIG. 2 are associated one by one. Therefore, as shown in FIG. 11, response signals to uplink data from the mobile station allocated SCCH #1 shown in FIG. 9 are mapped to downlink control channels CH #1 and CH #2, that is, mapped to subcarriers f1 to f4 and f17 to f20 shown in FIG. 2. Likewise, as shown in FIG. 11, response signals to uplink data from the mobile station allocated. SCCH #2 shown in FIG. 9 are mapped to downlink control channels CH #3 and CH #4, that is, to subcarriers f1 to f4 and f17 to f20 shown in FIG. 2. The same applies to SCCH #3 to SCCH #6.

Although downlink control channels CH #1 to CH #8 are mapped to sixteen subcarriers, subcarriers f1 to f4, f9 to f12, f17 to f20 and f25 to f28 in this way, with the above example, response signals are mapped only to eight subcarriers, subcarriers f1 to f4 and f17 to f20. That is, with the above example, response signals are only mapped to half of all subcarriers to which downlink control channels are mapped.

Therefore, even when CCE #1 to CCE #8 in downlink with downlink control channels CH #1 to CH #8 are associated one by one as shown in FIG. 11, similar to the case where uplink RB #1 to RB #8 and downlink control channels CH #1 to CH #8 are associated one by one as shown in FIG. 3, little frequency diversity effect may be obtained depending upon the positions to which downlink control channels are mapped.

Then, with the present embodiment, when downlink CCE #1 to CCE #8 and downlink control channels CH #1 to CH #8 are associated, the mapping of downlink control channels CH #1 to CH #8 is shown in FIG. 6 (Embodiment 1).

Figure 12:
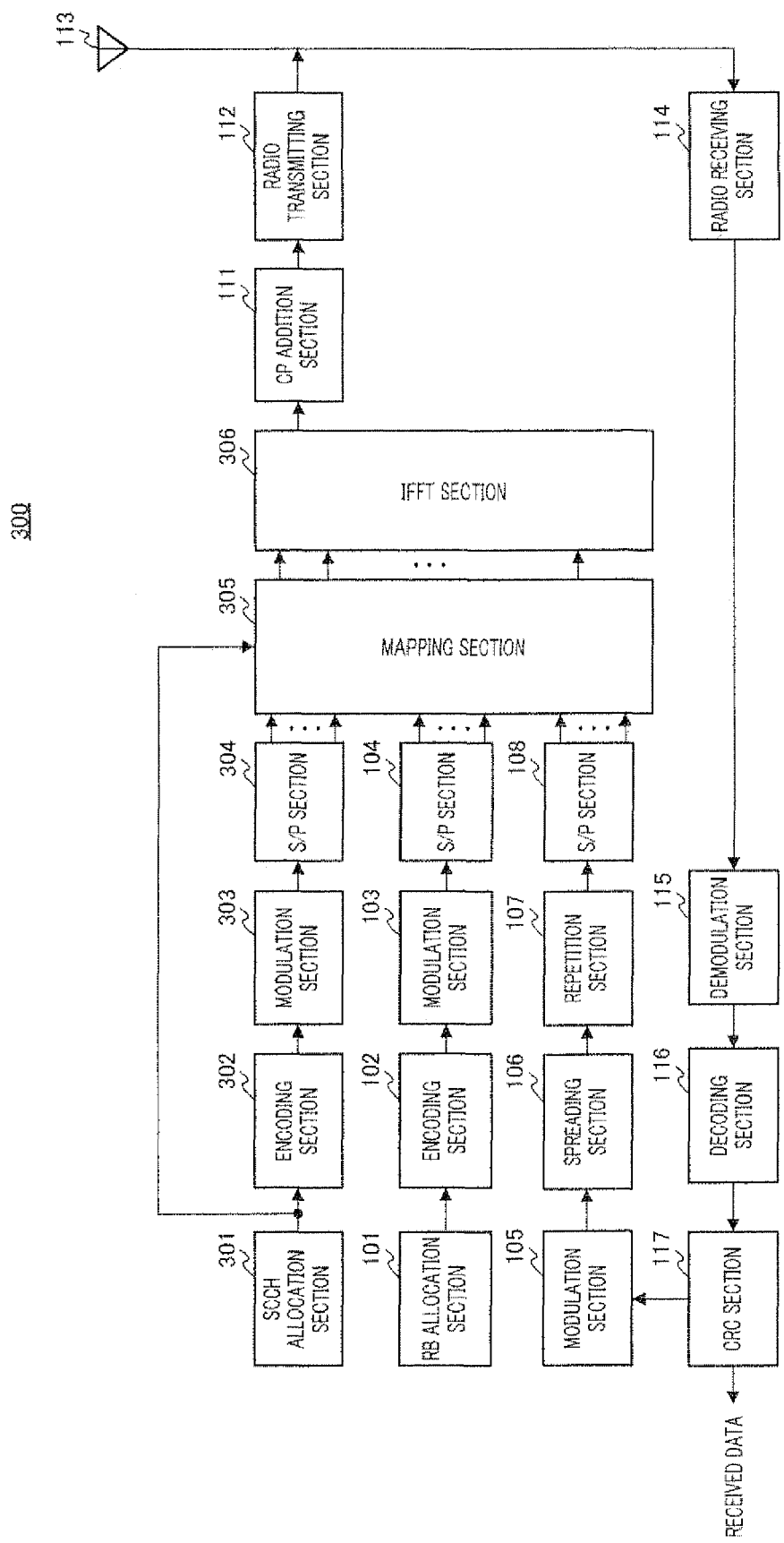
FIG. 12 is a block diagram showing the configuration of the base station according to Embodiment 4 of the present invention.
Figure 13:
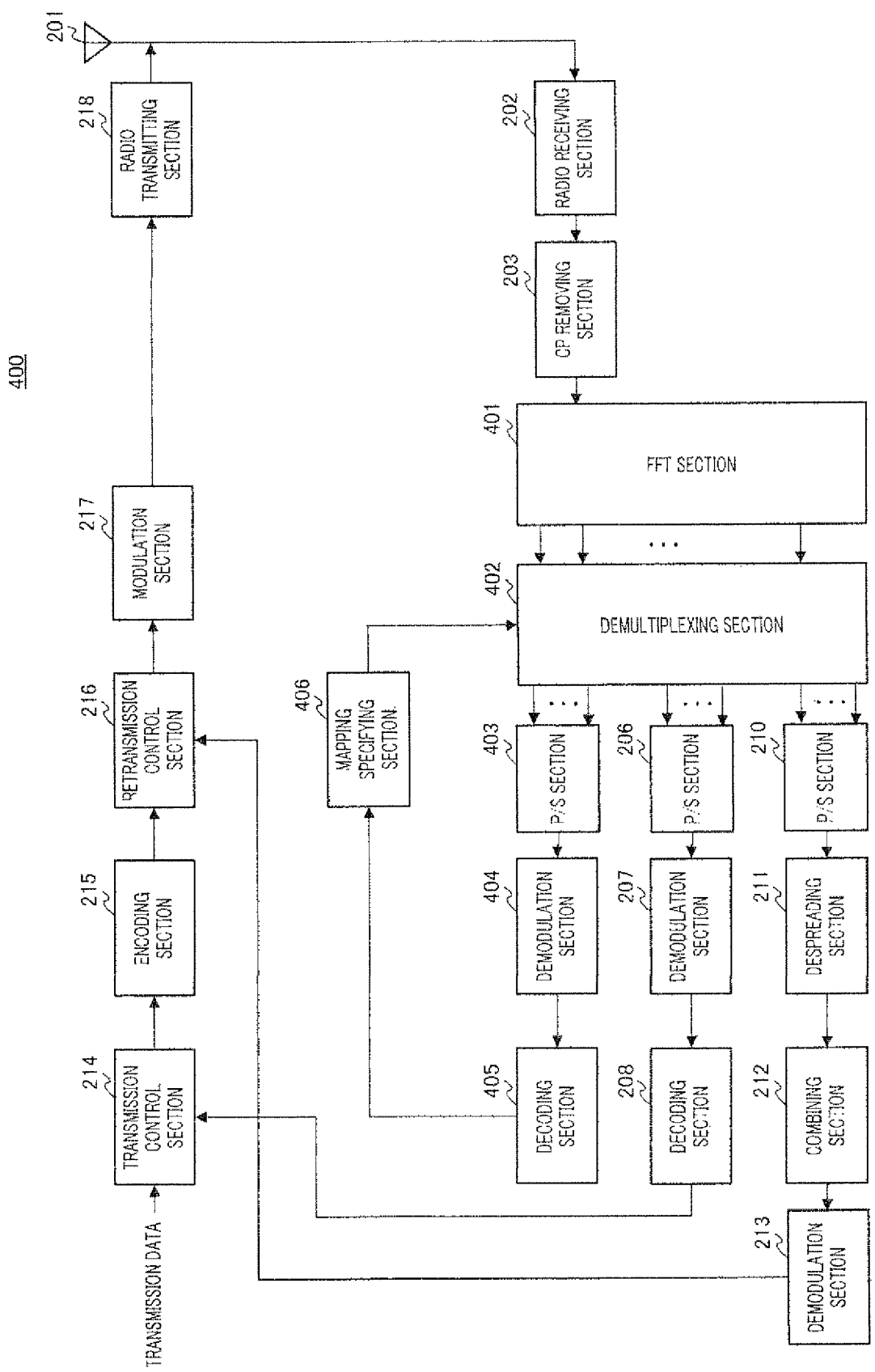
FIG. 13 is a block diagram showing the configuration of the mobile station according to Embodiment 4 of the present invention.

FIG. 12 shows the configuration of base station 300 according to the present embodiment, and FIG. 13 shows the configuration of mobile station 400 according to the present embodiment. In FIG. 12, the same reference numerals are assigned to the same components in FIG. 4 (Embodiment 1), and description thereof will be omitted. Further, in FIG. 13, the same reference numerals are assigned to the same components in FIG. 5 (Embodiment 1), and description thereof will be omitted.

In base station 300 shown in FIG. 12, SCCH allocation section 301 allocates SCCH #1 to SCCH #8 to mobile stations, generates SCCH allocation information, and outputs the SCCH allocation information to encoding section 302 and mapping section 305.

Encoding section 302 encodes the SCCH allocation information, and outputs the encoded SCCH allocation information to modulation section 303.

Modulation section 303 modulates the encoded SCCH allocation information, to generate SCCH allocation information symbols, and outputs the SCCH allocation information symbols to S/P section 304.

S/P section 304 converts the SCCH allocation information symbols received as input from modulation section 303 in series into parallel SCCH allocation information symbols, and outputs the parallel SCCH allocation information symbols to mapping section 305.

Mapping section 305 maps the SCCH allocation information symbols, the RB allocation information symbols and response signals to a plurality of subcarriers forming an OFDM symbol, and outputs the mapped SCCH allocation information symbols, RB allocation information symbols and response signals to IFFT section 306.

Here, based on the SCCH allocation information received as input from SCCH allocation section 301, mapping section 305 maps the response signals to downlink control channels mapped on the frequency domain in association with CCEs. For example, when mapping section 305 receives SCCH #1 shown in FIG. 9 from SCCH allocation section 301 as the SCCH allocation information for mobile station 400, as shown in FIG. 9, SCCH #1 is formed with CCE #1 and CCE #2 as shown in FIG. 11. For this reason, mapping section 305 maps the response signals to uplink data transmitted from mobile station 400 to downlink control channels CH #1 and CH #2 associated with CCE #1 and CCE #2. This mapping processing will be described later in detail.

Further, based on the SCCH allocation information received as input from SCCH allocation section 301, mapping section 305 maps RB allocation information symbols to SCCH #1 to SCCH #8 mapped on the frequency domain. For example, when mapping section 305 receives SCCH #1 from SCCH allocation section 301 as SCCH allocation information for mobile station 400, mapping section 305 maps the RB allocation information symbols to SCCH #1.

IFFT section 306 performs an IFFT on the SCCH allocation information symbols, RB allocation information symbols and response signals mapped to a plurality of subcarriers, to generate an OFDM symbol, and outputs the generated OFDM symbol to CP addition section 111.

Meanwhile, in mobile station 400 shown in FIG. 13, FFT section 401 performs an FFT on the OFDM symbol after CP removal, to acquire SCCH allocation information symbols, RB allocation information symbols and response signals, and outputs them to demultiplexing section 402.

Demultiplexing section 402 demultiplexes the input signals into the SCCH allocation information symbols, the RB allocation information symbols and response signals, and outputs the SCCH allocation information symbols to P/S section 403, the RB allocation information symbols to P/S section 206 and the response signals to P/S section 210. Here, based on the specified result received as input from mapping specifying section 406, demultiplexing section 402 demultiplexes the RB allocation information symbols and the response signals from the input signal.

P/S section 403 converts a plurality of parallel SCCH allocation information symbols received as input from demultiplexing section 402 into SCCH allocation information symbols in series, and outputs the SCCH allocation information symbols in series to demodulation section 404.

Demodulation section 404 demodulates the SCCH allocation information symbols, and outputs the demodulated SCCH allocation information to decoding section 405.

Decoding section 405 decodes the demodulated SCCH allocation information, and outputs the decoded SCCH allocation information to mapping specifying section 406.

Based on the SCCH allocation information received as input from decoding section 405, mapping specifying section 406 specifies downlink control channels to which response signals to uplink data transmitted from the mobile station are mapped. For example, when the SCCH allocation information for the mobile station is SCCH #1 shown in FIG. 9, SCCH #1 is formed with CCE #1 and CCE #2 as shown in FIG. 9, and therefore, as shown in FIG. 11, mapping specifying section 406 specifies CH #1 and CH #2 to be downlink control channels for the mobile station to which the response signals are mapped. Then, mapping specifying section 406 outputs the specified result to demultiplexing section 402. The specifying processing will be described later in detail.

Further, based on the SCCH allocation information received as input from decoding section 405, mapping specifying section 406 specifies the SCCH to which the RB allocation information symbols are mapped for the mobile station. For example, when the SCCH allocation information for a mobile station is SCCH #1, mapping specifying section 406 specifies SCCH #1 to be an SCCH for the mobile station to which the RB allocation information symbols for the mobile station are mapped.

Then, mapping specifying section 406 outputs the specified result to demultiplexing section 402.

Demodulation section 208 decodes the demodulated RB allocation information, and outputs the decoded RB allocation information to transmission control section 214.

Next, the mapping processing in mapping section 305 in base station 300 and the specifying processing in mapping specifying section 406 in mobile station 400 will be explained in detail.

With the present embodiment, mobile station 400 receives the KB allocation information transmitted from base station 300 using SCCH #1 to SCCH #8 shown in FIG. 9. Further, base station 300 maps response signals to uplink data (ACK signals and NACK signals) to downlink control channels CH #1 to CH #8, mapped in four frequency bands, subcarriers f1 to f4, f9 to f12, f17 to f20 and f25 to f28 shown in FIG. 6, and transmits the response signals to mobile station 400. Further, similar to FIG. 2, spreading section 106 in base station 300 spreads the response signal with spreading code having spreading factor 4, and repetition section 107 repeats the spread response signal with repetition factor 2. Further, as shown FIG. 11, the CCEs shown in FIG. 9 and the downlink control channels shown in FIG. 6 are associated one by one.

Mapping section 305 maps response signals for mobile station 400 to a plurality of downlink control channels that are associated with a plurality of CCEs and that are subject to distributed mapping on the frequency domain. Mapping section 305 holds association information between SCCHs and CCEs shown in FIG. 9, association information between CCEs and downlink control channels shown in FIG. 11, and the downlink control channel mapping information shown in FIG. 6, and, based on these, maps the response signals to subcarriers to which downlink control channels are mapped.

To be more specific, when the SCCH allocation information for mobile station 400 designates SCCH #1, SCCH #1 is formed with CCE #1 and CCE#2 as shown in FIG. 9. For this reason, mapping section 305 maps response signals to CH #1 associated with CCE #1 in FIG. 11, that is, maps response signals to subcarriers f1 to f4 and f17 to f20 shown in FIG. 6, and maps response signals to CH #2 associated with CCE #2, that is, maps response signals to subcarriers f9 to f12 and f25 to f28.

Here, in the downlink control channel mapping shown in FIG. 6, downlink control channels (e.g. CH #1 and CH #2) associated with two consecutive downlink CCEs in FIG. 9 (e.g. CCE #1 and CCE #2) are mapped to different frequency bands in a distributed manner. In other words, the downlink control channels mapped in a localized manner in identical frequency bands in FIG. 6 correspond to a plurality of non-consecutive downlink CCEs at two-CCE intervals in FIG. 9. To be more specific, for example, downlink control channels mapped to subcarriers f1 to f4 shown in FIG. 6 in a localized manner are downlink control channels CH #1, CH #3, CH #5 and CH #7, and the downlink CCEs associated with those downlink control channels are nonconsecutive CCEs at two-CCE intervals, CCE #1, CCE #3, CCE #5 and CCE #7, as shown in FIG. 11.

Consequently, when base station 300 transmits response signals to uplink data transmitted from mobile station 400 to which the RB allocation information is transmitted using an SCCH formed with a plurality of consecutive CCEs, it is possible to prevent response signals from being mapped concentrated in identical frequency bands. That is, base station 300 is able to map response signals over a plurality of frequency bands in a distributed manner, to transmit the response signals subject to distributed mapping. For example, as described above, when the SCCH allocation information for mobile station 400 designates SCCH #1, mapping section 305 maps response signals to subcarriers f1 to f4 and f17 to f20 shown in FIG. 6, and response signals to subcarriers f9 to f12 and f25 to f28. By this means, response signals are mapped to all subcarriers f1 to f4, f9 to f12, f17 to f20 and f25 to f28, uniformly, to which downlink control channels are mapped, in a distributed manner.

In this way, mapping section 305 maps response signals to downlink control channels based on the associations between SCCHs and CCEs shown in FIG. 9, the associations between CCEs and downlink control channels shown in FIG. 11, and the downlink control channel mapping shown in FIG. 6, so that radio transmitting section 112 in base station 300 is able to transmit response signals to mobile station 400 using downlink control channels that are associated with downlink CCEs and that are mapped in a distributed manner on the frequency domain.

Likewise, mapping specifying section 406 in mobile station 400 (FIG. 13) holds the association information between SCCHs and CCEs shown in FIG. 9, the association information between CCEs and downlink control channels shown in FIG. 11 and the downlink control channel mapping information shown in FIG. 6, and specifies the downlink control channels to which response signals for the mobile station are mapped, from the SCCH allocation information received. To be more specific, when mapping specifying section 406 receives as input SCCH allocation information showing that SCCH #1 shown in FIG. 9 is allocated to a mobile station from decoding section 405, based on the associations shown in FIGS. 9 and 11, mapping specifying section 406 specifies that the response signals for the mobile station are mapped to subcarriers f1 to f4 and f17 to f20, to which downlink control channel CH #1 is mapped and are mapped, to subcarriers f9 to f12 and f25 to f28, to which downlink control channel CH #2 is mapped, as shown in FIG. 6.

In this way, according to the present embodiment, when one SCCH is formed with a plurality of consecutive downlink CCEs, it is less likely that response signals concentrate in identical frequency bands and are code-multiplexed, so that it is possible to map response signals in a distributed manner on the frequency domain. Therefore, according to the present embodiment, similar to Embodiment 1, it is possible to maximize the frequency diversity effect on downlink control channels.

Although a case has been explained with the present embodiment where an SCCH is an example of a control channel formed with a plurality of CCEs, control channels to apply to the present invention is not limited to an SCCH. All control channels formed with a plurality of consecutive CCEs are applicable to the present invention.

Further, similar to Embodiment 2, mapping section 305 in the present embodiment may map response signals to a plurality of downlink control channels mapped in distributed manner on the frequency domain in different patterns.

Further, similar to Embodiment 3, mapping section 305 with the present embodiment may map response signals to a plurality of downlink control channels adopting different mapping patterns between neighboring cells or sectors.

Further, although a case has been explained with the present embodiment where SCCH allocation information is transmitted before RB allocation information is transmitted in an SCCH, it is not necessary to transmit SCCH allocation information before transmitting RB allocation information. For example, the base station includes mobile station IDs that can identify mobile stations in SCCHs and transmits them, and the mobile station decodes all received SCCHs and performs blind detection as to whether or not there is an SCCH for the mobile station, so that it is possible to make it unnecessary to transmit SCCH allocation information before transmitting RB allocation information.

Further, as for the time to switch downlink control channels associated with CCEs to a newly allocated SCCH, fixed time may be set up in advance, or time that changes adaptively may be informed from the base station to the mobile station using, for example, an SCCH.

Figure 14:
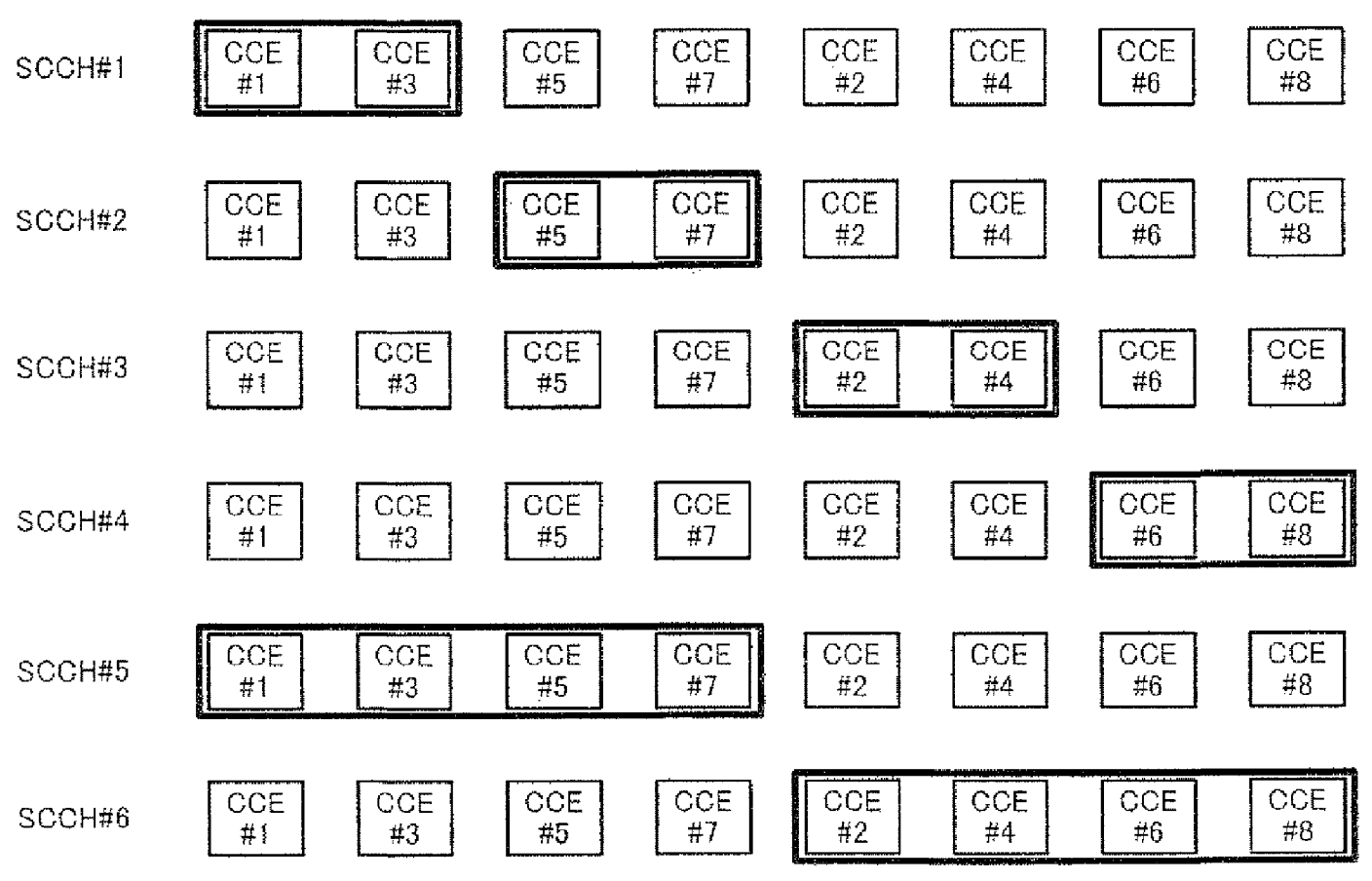
Figure 15:
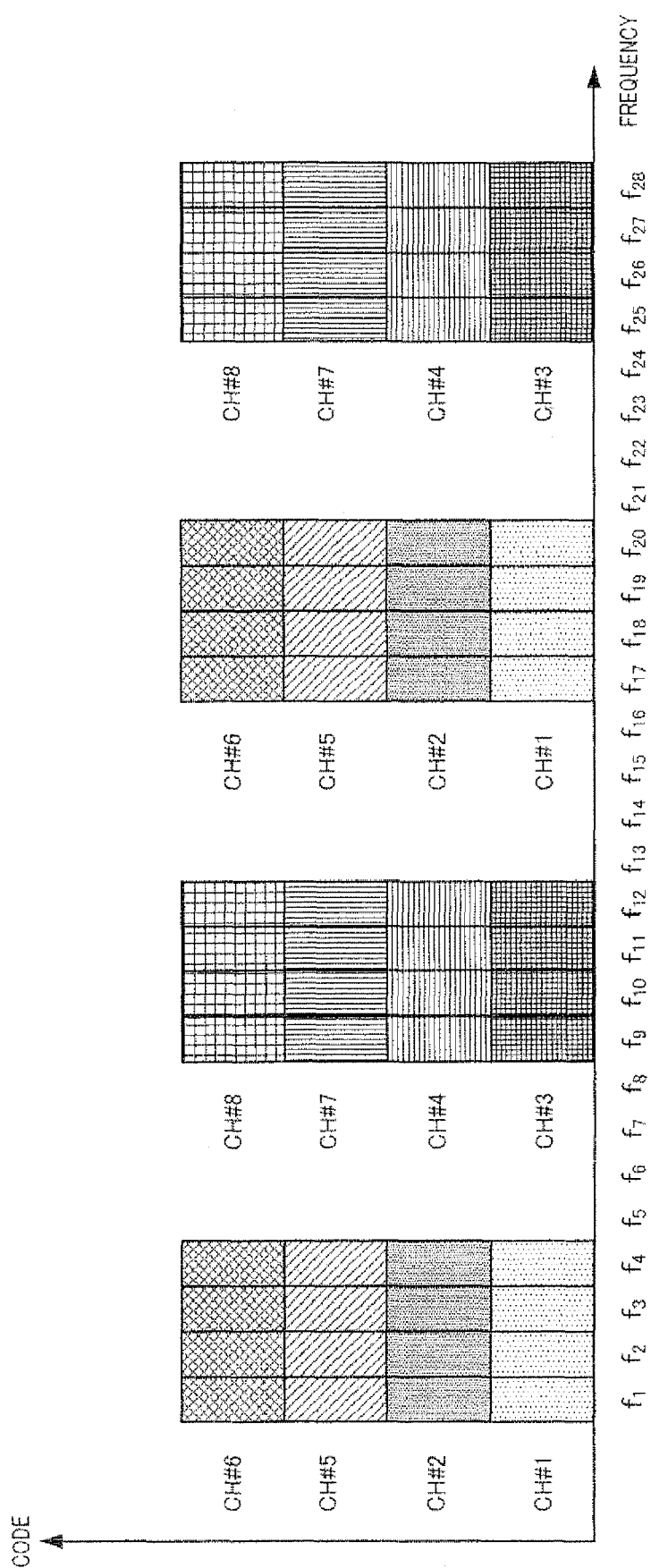
FIG. 15 illustrates the downlink control channel mapping according to Embodiment 4 of the present invention.

Further, when SCCH #1 to SCCH #6 adopt the configurations shown in FIG. 14, that is, when SCCH #1 is formed with CCE #1 and CCE #3, SCCH #2 is formed with CCE #5 and CCE #7, SCCH #3 is formed with CCE #2 and CCE #4, SCCH #4 is formed with CCE #6 and CCE #8, SCCH #5 is formed with CCE #1, CCE #3, CCE #5 and CCE #7, and SCCH #6 is formed with CCE #2, CCE #4, CCE #6 and CCE #8, downlink control channels CH #1 to CH #8 may be mapped as shown in FIG. 15. The downlink control channels (e.g. CH #1 and CH #3) associated with a plurality of downlink CCEs forming the SCCHs (e.g. CCE #1 and CCE #3 forming SCCH #1) in FIG. 14 are mapped in different frequency bands in a distributed manner. Consequently, when base station 300 transmits response signals to uplink data transmitted from mobile station 400, to which RB allocation information is transmitted, using an SCCH formed with a plurality of CCEs, it is possible to prevent response signals from being mapped concentrated in identical frequency bands. That is, as described above, base station 300 is able to transmit response signals by mapping the response signals to a plurality of bands in a distributed manner.

Embodiment 5

A case will be explained with the present embodiment where the number of CCEs to use varies on a per subframe basis.

Studies are underway to change the number of OFDM symbols upon which CCEs, which forms a downlink control channel (e.g. SCCH) to report uplink or downlink allocation information, are multiplexed (hereinafter referred to as "the number of OFDMs for multiplexing") on a per subframe basis. At that time, the number of OFDMs for multiplexing is reported from the base station to mobile stations using a PCFICH (Physical Control Format Indicator Channel). There are more physical resources to multiplex CCEs upon increasing the number of OFDMs for multiplexing, and therefore, the number of CCEs to use further increases. For example, when the number of OFDMs for multiplexing is one amongst CCE #1 to CCE #16 shown in FIG. 16, CCE #1 to CCE #4 are multiplexed on one OFDM symbol, and, when the number of OFDMs for multiplexing is two, CCE #1 to CCE #16 are multiplexed on two OFDM symbols. That is, in the case where one SCCH is formed with one CCE or a plurality of CCEs, any of CCE #1 to CCE #4 are used when the number of OFDMs for multiplexing is one and any of CCE #1 to CCE #16 are used when the number of OFDMs for multiplexing is two.

Figure 16:
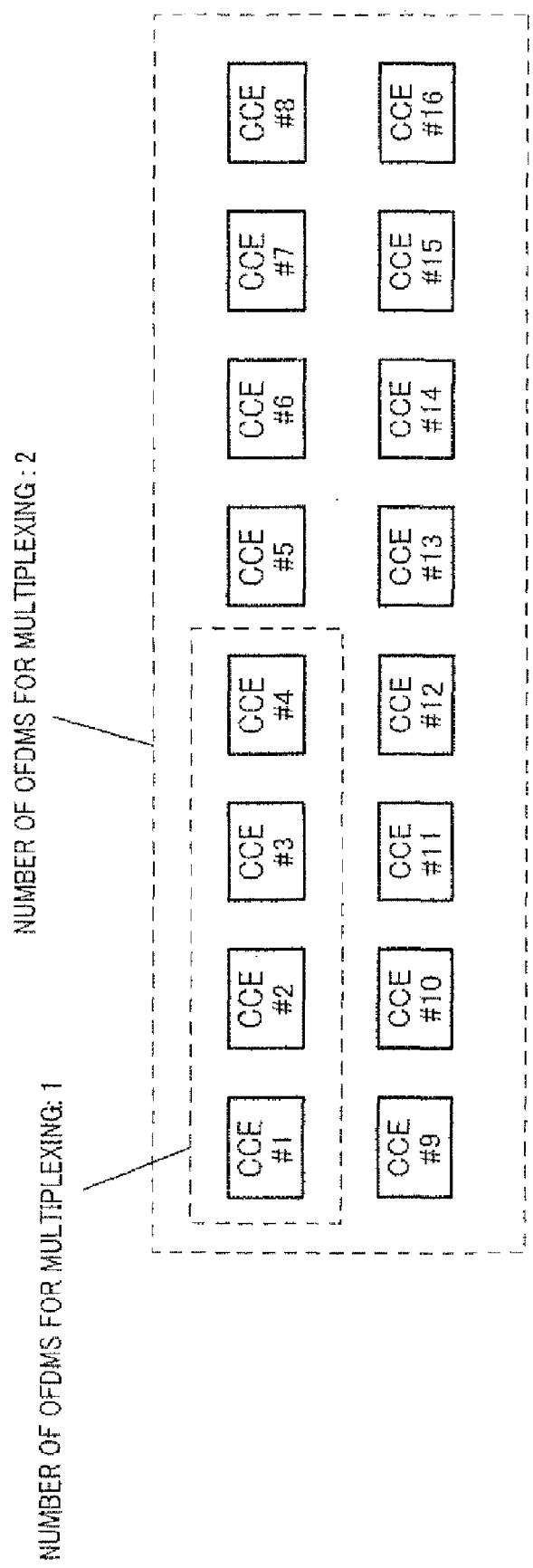
FIG. 16 illustrates downlink CCEs used in the number of OFDMs for multiplexing according to Embodiment 5 of the present invention.

At this time, amongst CCE #1 to CCE #16 shown in FIG. 16, while CCE #1 to CCE #4 are used when a plurality of numbers of OFDMs for multiplexing (one or two) are different, CCE #5 to CCE #16 are only used when the number of OFDMs for multiplexing is two. That is, CCE #1 to CCE #16 are sorted into CCEs to use between a plurality of different numbers of OFDMs for multiplexing, and CCEs not to use. Further, CCEs with downlink control channels for transmitting response signals in downlink are associated, and the number of CCEs to use increases or decreases depending on the number of OFDMs for multiplexing, and accordingly, the number of downlink control channels used to transmit response signals increases or decreases. That is, similar to CCEs, downlink control channels are sorted into downlink control channels to use between a plurality of different numbers of OFDMs for multiplexing, and downlink control channels not to use.

Here, if the number of OFDMs for multiplexing is one, that is, if CCE #1 to CCE #4 shown in FIG. 16 are only used, downlink control channels CH #1 to CH #4 are mapped concentrated in identical frequency bands, subcarriers f1 to f4 and subcarriers f17 to f20, subject to downlink control channel mapping shown in FIG. 2, for example. For this reason, transmission power varies between frequency bands to which downlink control channels are mapped (i.e. between four frequency bands of subcarriers f1 to f4, f9 to f12, f17 to f20 and f25 to f28 in FIG. 2). Particularly, if response signals concentrate and are code-multiplexed in frequency bands to which downlink control channels CH #1 to CH #4 are mapped, interfering power against other cells increases. Further, ISI increases in frequency bands in which response signal concentrate and are code-multiplexed.

Then, with the present embodiment, downlink control channels for transmitting response signals in association with CCEs to use between a plurality of different numbers of OFDMs for multiplexing, are mapped in a distributed manner on the frequency domain.

Figure 17:
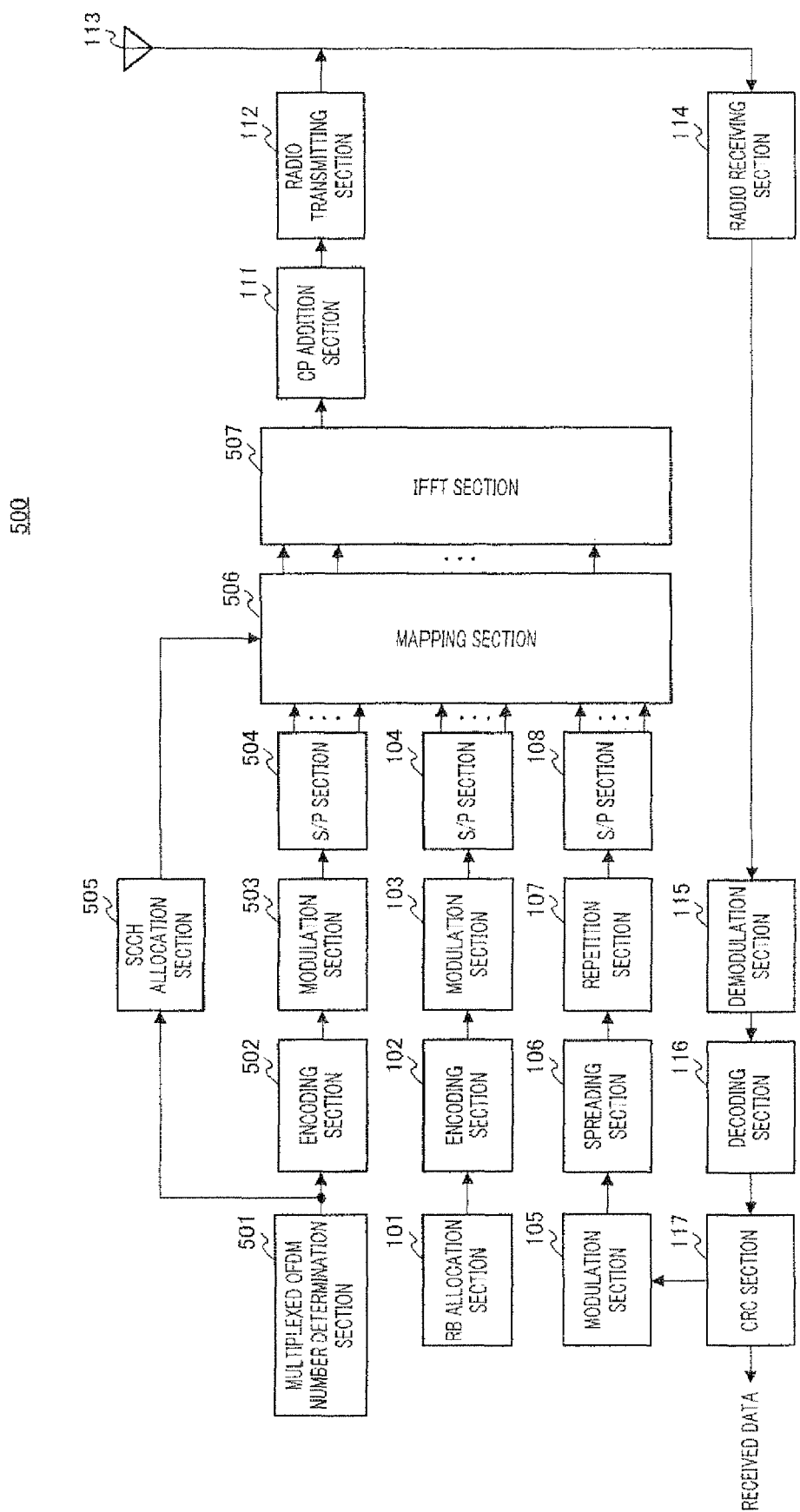
FIG. 17 is a block diagram showing the configuration of the base station according to Embodiment 5 of the present invention.
Figure 19:
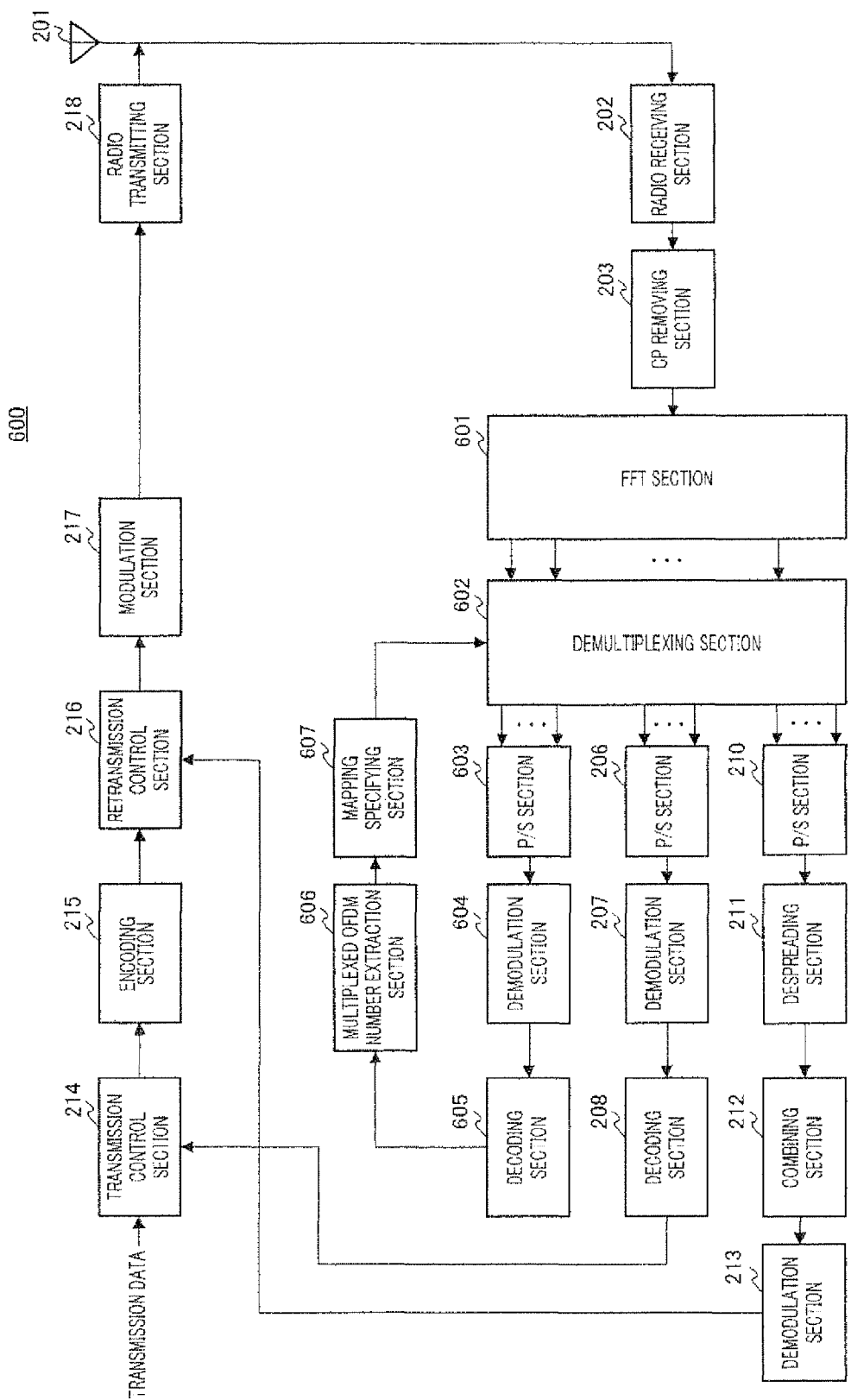
FIG. 19 is a block diagram showing the configuration of the mobile station according to Embodiment 5 of the present invention.

FIG. 17 shows the configuration of base station 500 according to the present embodiment, and FIG. 19 shows the configuration of mobile station 600 according to the present embodiment. In FIG. 17, the same reference numerals are assigned to the same components in FIG. 12 (Embodiment 4), and description thereof will be omitted. Further, in FIG. 19, the same reference numerals are assigned to the same components in FIG. 13 (Embodiment 4), and description thereof will be omitted.

In base station 500 shown in FIG. 17, multiplexed OFDM number determination section 501 determines the number of OFDM symbols upon which CCEs are multiplexed according to the number of SCCHs that are required to report control information on a per subframe basis. To be more specific, multiplexed OFDM number determination section 501 determines increasing the number of OFDMs for multiplexing when the number of SCCHs that are required to report control information is greater. Then, multiplexed OFDM number determination section 501 generates multiplexed OFDM number determination information showing the number of OFDMs for multiplexing determined, and outputs the generated multiplexed OFDM number determination information to encoding section 502 and SCCH allocation section 505.

Encoding section 502 encodes the multiplexed OFDM number determination information, and outputs the encoded multiplexed OFDM number determination information to modulation section 503.

Modulation section 503 modulates the encoded multiplexed OFDM number determination information, to generate multiplexed OFDM number determination symbols, and outputs the multiplexed OFDM number determination information symbols to S/P section 504.

S/P section 504 converts the multiplexed OFDM number determination information symbols received as input from modulation section 503 in series into parallel multiplexed OFDM number determination information symbols, and outputs the parallel information symbols to mapping section 506.

Based on the multiplexed OFDM number determination information received as input from multiplexed OFDM number determination section 501, SCCH allocation section 505 allocates SCCHs to mobile stations. For example, when the number of OFDMs for multiplexing received as input from multiplexed OFDM number determination section 501 is one, SCCH allocation section 505 allocates SCCHs formed with one CCE or a plurality of CCEs amongst CCE #1 to CCE #4 shown in above FIG. 16, to mobile stations. Meanwhile, when the number of OFDMs for multiplexing received as input from multiplexed OFDM number determination section 501 is two, SCCH allocation section 505 allocates SCCHs formed with one CCE or a plurality of CCEs amongst CCE #1 to CCE #16 shown in above FIG. 16, to mobile stations.

Mapping section 506 maps the multiplexed OFDM number determination information symbols, the RB allocation information symbols and response signals to a plurality of subcarriers forming an OFDM symbol, and outputs them to IFFT section 507. Here, mapping section 506 maps response signals to downlink control channels CH #1 to CH #16 including downlink control channels CH #1 to CH #4, which are mapped in a distributed manner on the frequency domain in association with CCE #1 to CCE #4 to use between a plurality of different numbers of OFDMs for multiplexing, amongst CCE #1 to CCE #16 shown in above FIG. 16. This mapping processing will be described later in detail.

Further, mapping section 506 maps the multiplexed OFDM number determination information symbols to PCFICHs mapped on the frequency domain.

IFFT section 507 performs an IFFT on the multiplexed OFDM number determination information symbols, the RB allocation information symbols and response signals mapped to a plurality of subcarriers, to generate an OFDM symbol, and outputs the generated OFDM symbol to CP addition section 111.

Figure 18A:
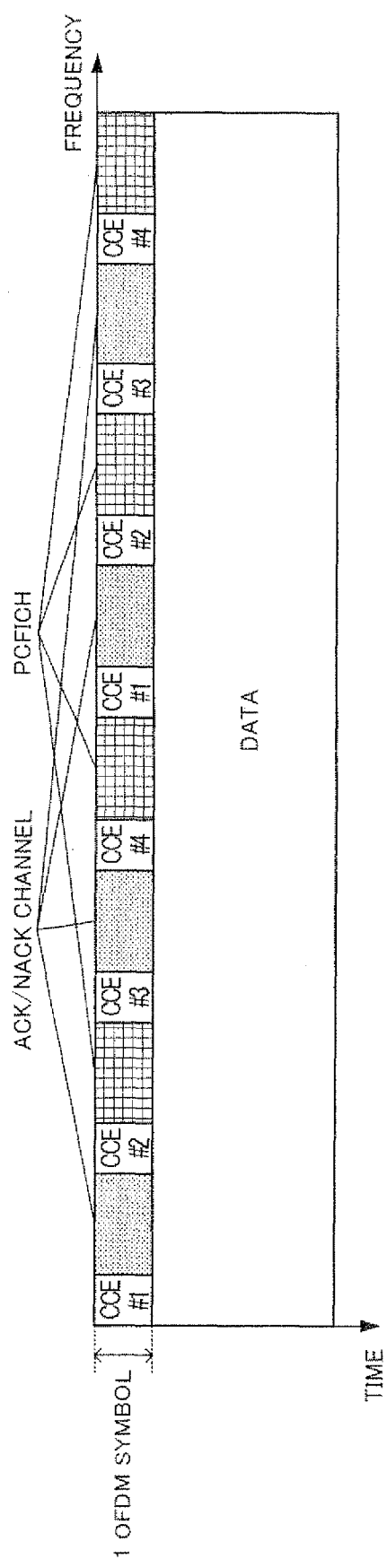
FIG. 18A illustrates the physical resources (the number of OFDMs for multiplexing: 1), according to Embodiment 5 of the present invention.
Figure 18B:
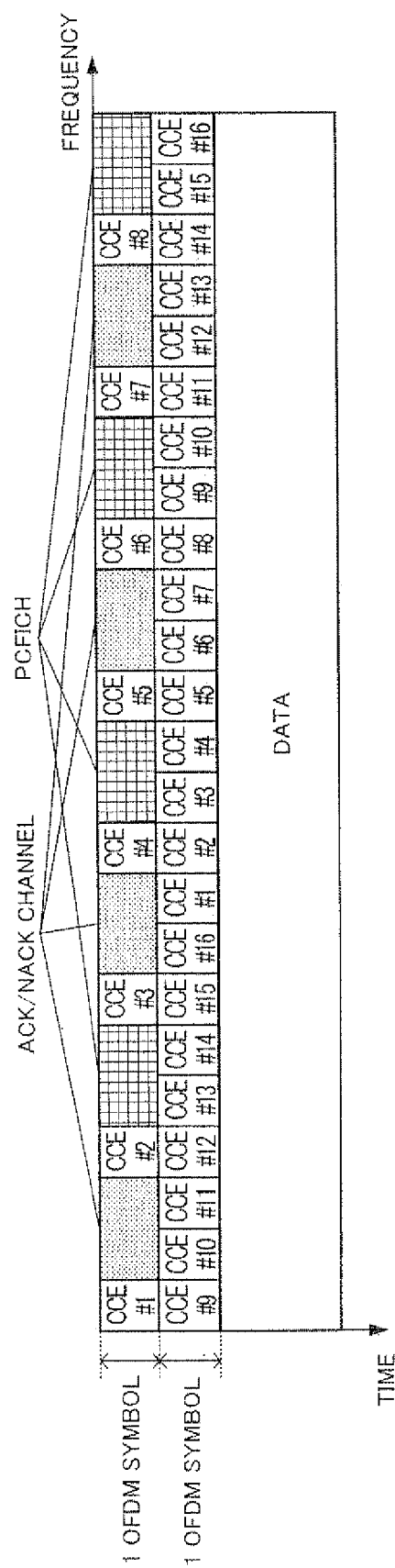
FIG. 18B illustrates the physical resources (the number of OFDMs for multiplexing: 2), according to Embodiment 5 of the present invention.

Downlink control channels for transmitting response signals (e.g. ACK/NACK channels), PCFICHs and CCEs are multiplexed on physical resources defined in the frequency domain and time domain as shown in FIGS. 18A and 18B, for example. When the number of OFDMs for multiplexing is one, as shown in FIG. 18A, ACK/NACK channels, PCFICHs and CCE #1 to CCE #4 are multiplexed on one OFDM symbol, and when the number of OFDMs for multiplexing is two, as shown in FIG. 18B, ACK/NACK channels, PCFICHs and CCE #1 to CCE #16 are multiplexed on two OFDM symbols.

Meanwhile, in mobile station 600 shown in FIG. 19, FFT section 601 performs an FFT on the OFDM symbol after CP removal, to acquire the multiplexed OFDM number determination information symbols, RB allocation information symbols and response signals, and outputs them to demultiplexing section 602.

Demultiplexing section 602 demultiplexes the input signals into the multiplexed OFDM number determination information symbols, the RB allocation information symbols and the response signals, and outputs the multiplexed OFDM number determination information symbols to P/S section 603, the RB allocation information symbols to P/S section 206 and the response signals to P/S section 210.

P/S section 603 converts the parallel multiplexed OFDM number determination information symbols received as input from demultiplexing section 602 into the multiplexed OFDM number determination information symbols in series, and outputs the multiplexed OFDM number determination information symbols in series to demodulation section 604.

Demodulation section 604 demodulates the multiplexed OFDM number determination information symbols, and outputs the demodulated multiplexed OFDM number determination information to decoding section 605.

Decoding section 605 decodes the demodulated multiplexed OFDM number determination information, and outputs the decoded multiplexed OFDM number determination information to multiplexed OFDM number extraction section 606.

Multiplexed OFDM number extraction section 606 extracts the number of OFDMs for multiplexing that is multiplexed from the multiplexed OFDM number determination information received as input from decoding section 605.

Based on the number of OFDMs for multiplexing received as input from multiplexed OFDM number extraction section 606, mapping specifying section 607 specifies downlink control channels to which response signals are mapped and CCEs to use for SCCH allocation. Then, mapping specifying section 607 outputs the specified result to demultiplexing section 602. The specifying processing will be described later in detail.

Next, the mapping processing in mapping section 506 in base station 500 and the specifying processing in mapping specifying section 607 in mobile station 600 will be explained in detail.

Figure 20:
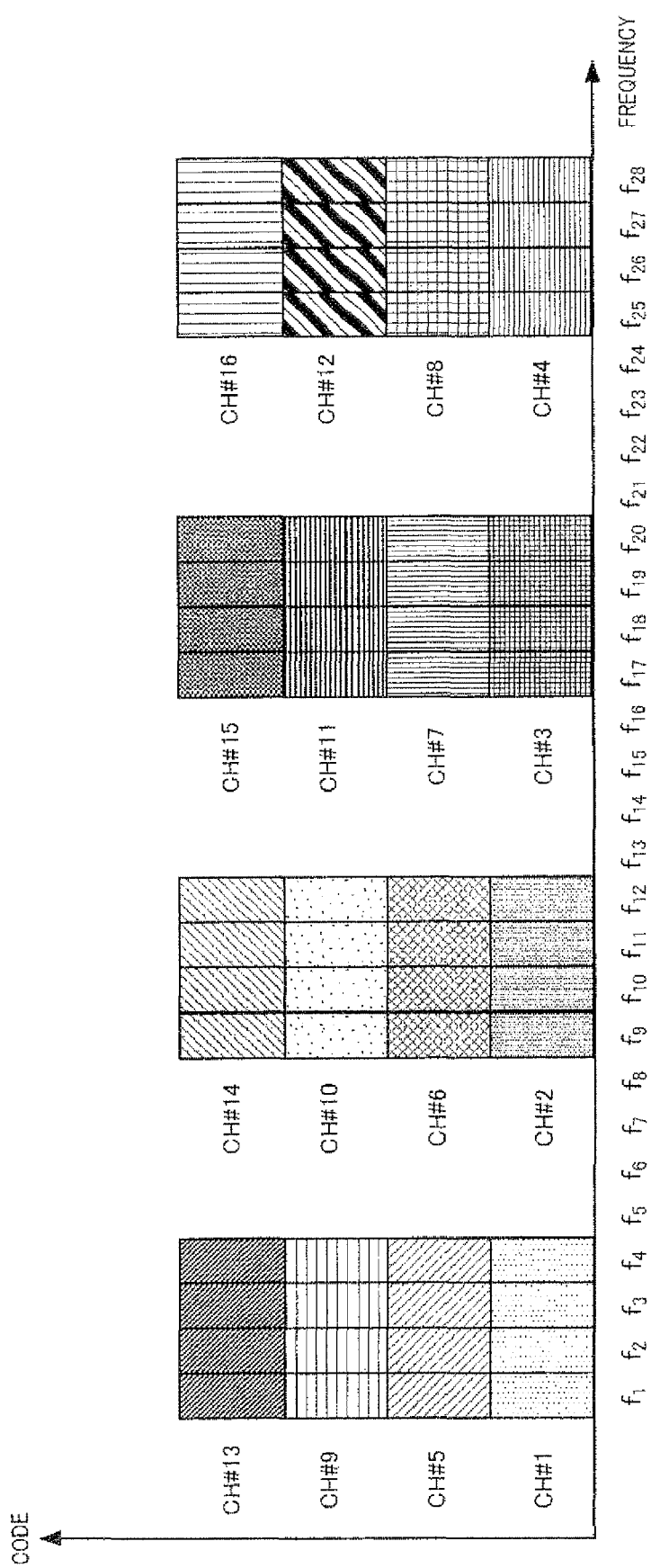
FIG. 20 illustrates the downlink control channel mapping according to Embodiment 5 of the present invention.

With the present embodiment, as shown in FIG. 16, there are two possible values for the number of OFDMs for multiplexing, one or two. Further, mobile station 600 receives the RB allocation information transmitted from base station 500 using SCCHs formed with one CCE or a plurality of CCEs, amongst CCE #1 to CCE #16 shown in FIG. 16. Further, similar to Embodiment 4, spreading section 106 in base station 500 spreads the response signal with spreading code having spreading factor 4, and repetition section 107 repeats the spread response signal with repetition factor 2. However, for ease of explanation, an explanation will be given to only downlink control channels CH #1 to CH #16 mapped to four frequency bands, subcarriers f1 to f4, f9 to f12, f17 to f20 and f25 to f28, to which response signals are mapped, as shown in FIG. 20, without taking into consideration of repetition. Further, CCE #1 to CCE #16 shown in FIG. 16 and downlink control channels CH #1 to CH #16 shown in FIG. 20 are associated one by one.

Mapping section 506 maps the response signals for mobile station 600 to downlink control channels CH #1 to CH #16 including CH #1 to CH #4 that are subject to distributed mapping on the frequency domain and that are associated with CCE #1 to CCE #4 to use between a plurality of different numbers of OFDMs for multiplexing amongst CCE #1 to CCE #16 shown in above FIG. 16.

That is, as shown in FIG. 20, downlink control channel CH #1 is mapped to subcarriers f1 to f4, downlink control channel CH #2 is mapped to subcarriers f9 to f12, downlink control channel CH #3 is mapped to subcarriers f17 to f20, and downlink control channel CH #4 is mapped to subcarriers f25 to f28.

Further, as shown in FIG. 20, downlink control channels CH #5 to CH #16 other than downlink control channels CH #1 to CH #4 are mapped to four frequency bands, subcarriers f1 to f4, f9 to f12, f17 to f20 and f25 to f28.

Here, in the downlink control channel mapping shown in FIG. 20, downlink control channels CH #1 to CH #4, which are associated with CCE #1 to CCE #4 to use between a plurality of different numbers of OFDMs for multiplexing (one or two) in FIG. 16, are mapped in a distributed manner in different bands. In other words, the downlink control channels mapped in a localized manner in identical frequency bands in FIG. 20 are one channel out of downlink control channels CH #1 to CH #4 associated with CCE #1 to CCE #4 to use between a plurality of different numbers of OFDMs for multiplexing in FIG. 16, and three channels out of downlink control channels CH #5 to CH #16 associated with CCE #5 to CCE #16 used only when the number of OFDMs for multiplexing is two in FIG. 16. To be more specific, for example, downlink control channels mapped to subcarriers f1 to f4 shown in FIG. 20 in a localized manner are downlink control channels CH #1, CH #5, CH #9 and CH #13. As shown in FIG. 16, downlink CCEs in association with these downlink control channels are CCE #1 to use between a plurality of different numbers of OFDMs for multiplexing (one or two), and CCE #5, CCE #9 and CCE #13, which are used only when the number of OFDMs for multiplexing is two.

Consequently, when base station 500 transmits response signals to uplink data transmitted from mobile station 600, transmitted RB allocation information using SCCHs formed with CCEs to use between a plurality of different numbers of OFDMs for multiplexing, it is possible to prevent response signals from being mapped concentrated in identical frequency bands. That is, base station 500 is able to map response signals over a plurality of frequency bands in a distributed manner, to transmit the response signals subject to distributed mapping even when the number of OFDMs for multiplexing is one. That is, the number of response signals to code multiplex is the same between frequency bands.

By this means, transmission power in frequency bands to which downlink control channels for transmitting response signals are mapped changes little, and therefore, the effect of averaging transmission power improves. That is, it is possible to suppress an increase in part of transmission power in frequency bands to which downlink control channels are mapped, in a concentrated manner, so that it is possible to reduce inter-cell interference between neighboring cells. Further, it is possible to prevent response signals from being mapped concentrated in identical frequency bands because response signals are mapped in a distributed manner on the frequency domain, so that it is also possible to reduce ISI between downlink control channels mapped in identical frequency bands.

In this way, based on the information about the number of OFDMs for multiplexing shown in FIG. 16 and the downlink control channel mapping shown in FIG. 20, mapping section 506 maps response signals to downlink control channels. By this means, radio transmitting section 112 in base station 500 is able to transmit response signals to mobile station 600 using downlink control channels mapped in a distributed manner on the frequency domain in association with downlink CCEs to use between a plurality of different numbers of OFDMs for multiplexing.

Likewise, mapping specifying section 607 in mobile station 600 (FIG. 19) holds the information on the number of OFDMs for multiplexing shown in FIG. 16 and the downlink control channel mapping information shown in FIG. 20, and specifies the downlink control channels to which response signals for the mobile station are mapped, from the multiplexed OFDM number determination information received. For example, when the number of OFDMs for multiplexing received as input from multiplexed OFDM number extraction section 606 is one, mapping specifying section 607 specifies downlink control channels to which response signals for the mobile station are mapped, from downlink control channels CH #1 to CH #4 shown in FIG. 20 in association with CCE #1 to CCE #4 shown in FIG. 16.

In this way, according to the present embodiment, downlink control channels in association with CCEs to use between different numbers of OFDMs for multiplexing are mapped in a distributed manner on the frequency domain. In this way, it is less likely that response signals concentrate in identical frequency bands and code-multiplexed. Therefore, the present embodiment provides the same advantage as in Embodiment 4. Further, according to the present embodiment, even when the number of OFDMs for multiplexing changes on a per subframe basis, transmission power of downlink control channels are averaged between the frequency bands, so that it is possible to reduce inter-cell interference between neighboring cells. Further, according to the present embodiment, it is possible to reduce ISI between downlink control channels mapped in identical frequency band.

Although a case has been explained with the present embodiment where there are two possible values, one or two, for the number of OFDMs for multiplexing, the present invention may also be implemented where there are three or more possible values for the number of OFDMs for multiplexing.

Further, although a case has been explained with the present embodiment where a plurality of CCEs are sorted into the CCEs to use between a plurality of different numbers of OFDMs for multiplexing, and the CCEs not to use, a plurality of CCEs may be sorted based on how often they are used. For example, if the number of OFDMs for multiplexing is between one and three, a CCE to use where the number of OFDMs for multiplexing is between one and three is "high" frequency of use, a CCE to use where the number of OFDMs for multiplexing is two or three is "medium" frequency of use, and a CCE to use where the number of OFDMs for multiplexing is only three is "low" frequency of use. Then, the base station may map response signals to downlink control channels in a distributed manner on the frequency domain in association with a CCE of "high" frequency of use.

A case has been explained with the present embodiment where the CCE numbers of CCEs (i.e. CCE #1 to CCE #4 shown in FIG. 16) to use between a plurality of different numbers of OFDMs for multiplexing are consecutive. However, the CCE numbers of CCEs to use between a plurality of different numbers of OFDMs for multiplexing are not limited to be consecutive. The present invention may also be implemented where the CCE numbers of CCEs to use between a plurality of different numbers of OFDMs for multiplexing are nonconsecutive.

Further, although a case has been explained with the present embodiment where the CCE numbers and the downlink control channels for transmitting response signals are associated, the present invention may also be implemented in a case where downlink control channels formed with a plurality of CCEs, for example, the SCCH numbers of SCCHs, and downlink control channels for transmitting response signals are associated.

Further, although a case has been explained with the present embodiment where response signals are multiplexed on a plurality of downlink control channels mapped in different frequency bands in association with a plurality of CCEs to use between a plurality of different numbers of OFDMs for multiplexing, multiplexing response signals on a plurality of downlink control channels mapped in different bands and multiplexing response signals on different spreading coding blocks are equivalent.

Further, although a case has been explained with the present embodiment where the number of OFDMs for multiplexing is determined according to the number of SCCHs that are required to report control information, with the present invention, where the number of OFDMs for multiplexing may be determined according to other control information without limiting to the number of SCCHs. For example, the number of OFDMs for multiplexing may be determined according to the number of multiplexing of ACK/NACK channels that multiplex response signals.

Embodiments of the present invention have been explained.

The present invention may be applicable to mobile stations located near a cell edge. Generally, channel quality is poorer near a cell edge than in the center of a cell, and a mobile station near a cell edge transmits uplink data using a low level MCS (Modulation and Coding Scheme). That is, a mobile station near a cell edge transmits uplink data using a lower coding rate and a modulation scheme of a smaller M-ary modulation number than a mobile station near the center of a cell, and therefore, longer uplink data lengths, that is, more consecutive RBs are required. Then, by applying the present invention to a mobile station near a cell edge, it is possible to obtain greater frequency diversity effect.

Further, although cases have been explained with the above embodiments as an example of completely consecutive RBs, the present invention may also be implemented by RBs with high consecutiveness even when the RBs have partly nonconsecutive portions.

Further, although cases have been explained with the above embodiments where the number of uplink RBs and the number of downlink CCEs are eight, the number of uplink RBs and the number of downlink CCEs are not limited to eight.

Figure 21:
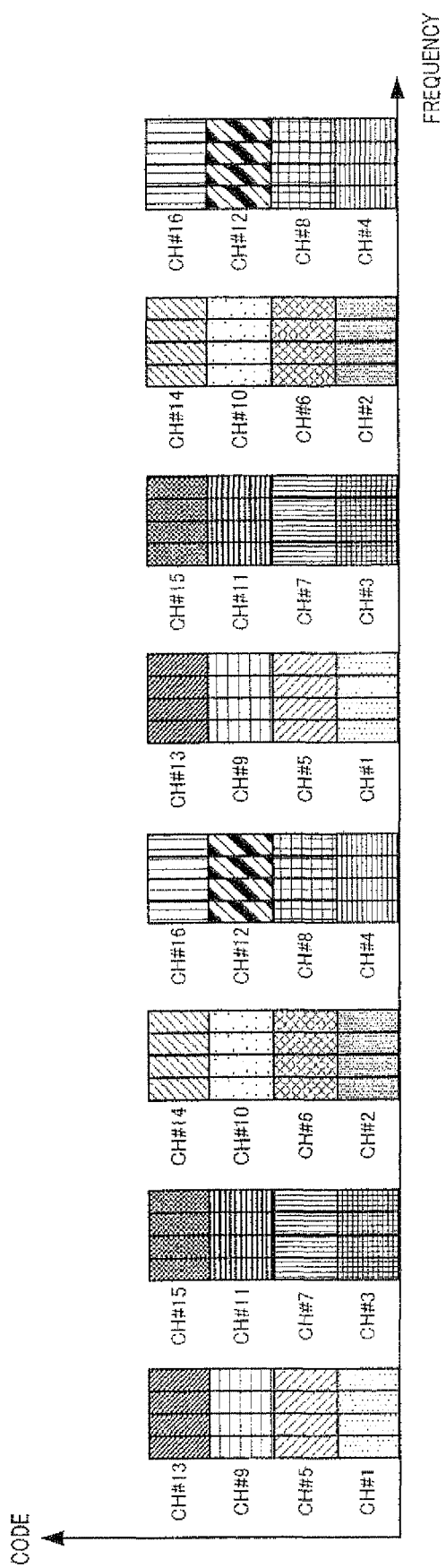
FIG. 21 illustrates another downlink control channel mapping (example 1)

Further, although cases have been explained with the above embodiments as an example where eight downlink control channels CH #1 to CH #8 are mapped to sixteen subcarriers, subcarriers f1 to f4, f9 to f12, f17 to f20 and f25 to f28, the number of subcarriers and the number of downlink control channels are not limited to these numbers. For example, as shown in FIG. 21, sixteen downlink control channels CH #1 to CH #16 are mapped to thirty two subcarriers as shown in FIG. 21.

Further, although cases have been explained with the above embodiments to show only subcarriers to which downlink control channels are mapped in the figures, other control channels or data channels may be mapped to frequencies besides frequencies to which downlink control channels are mapped.

Figure 22:
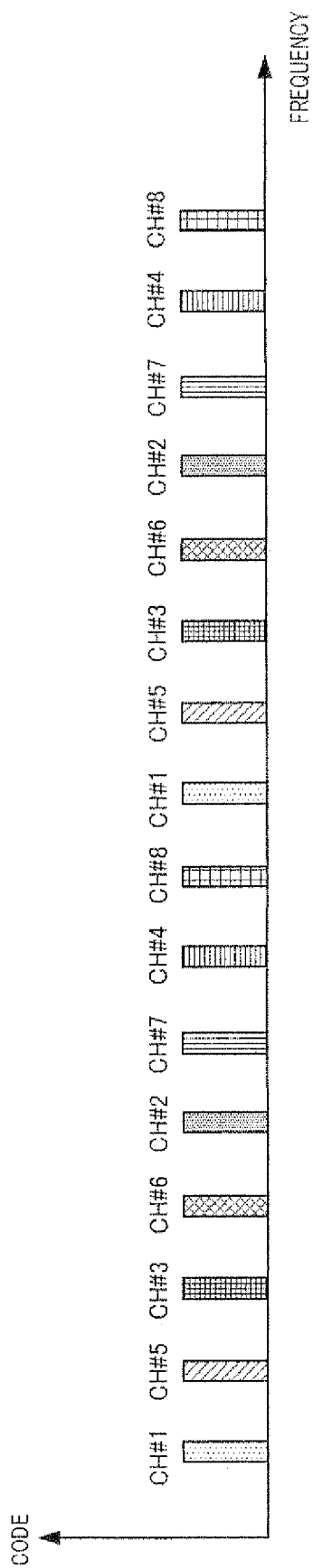
FIG. 22 illustrates another downlink control channel mapping (example 2).

Further, although cases have been explained with the above embodiments where a response signal is spread, a response signal may be mapped to a downlink control channel mapped to frequencies without spreading a response signal and transmitted. For example, as shown in FIG. 22, a response signal may be mapped to downlink control channels CH #1 to CH #8 in a distributed manner on the frequency domain, without is spreading a response signal, that is, without code-multiplexing on the same frequencies.

Further, although cases have been explained with the above embodiments as examples where spreading factor SF is 4 in spreading section 106 and repetition factor RF is 2 in repetition section 107, SF and RF are not limited to these values.

Further, although cases have been explained with the above embodiments about the downlink control channel mapping method, the present invention may be applicable to uplink control channels. For example, the mobile station performs the same processing as above base station 100 or 300 and the base station performs the same processing as the mobile station 200 or 400, so that the present invention may be applicable to uplink.

Further, although cases have been explained with the above embodiments where DFTs-FDMA is used as an uplink access scheme, the present invention is not limited to DFTs-FDMA, and, the same advantage as above may be provided in a communication scheme in which a plurality of consecutive RBs are allocated to one mobile station and a communication scheme in which one control channel is formed from a plurality of consecutive CCEs.

Further, although cases have been explained with the above embodiments as an example where the downlink communication scheme is the OFDM scheme, the downlink communication scheme is not limited in the present invention, and the same advantage as above may be provided in a communication scheme of performing transmission using different frequencies.

Further, the downlink control channels for transmitting response signals used in the explanation of the above embodiments are channels for feeding back ACK signals or NACK signals for mobile stations. For this reason, the downlink control channels for transmitting response signals may be referred to as "DCCHs (Dedicated Control Channels)," "ACK/NACK channels," "response channels" and "HICH (Hybrid ARQ Indicator Channel)."

Further, although cases have been explained with the above embodiments about downlink control channels for mapping response signals, signals mapped to downlink control channels are not limited to response signals. For example, control signals for reporting a modulation scheme or coding rate upon retransmission, control signals for reporting transmission power upon retransmission, control signals for reporting a time transmission is performed upon retransmission, or control signals for reporting RB allocations upon retransmission are mapped to downlink control channels.

Further, the RB used in the explanation with the above embodiments may be other transmission units on the frequency domain, for example, a subcarrier block and a sub-band.

A base station, a mobile station and a subcarrier may be referred to as a "Node B," a "UE," and a "tone," respectively. A CP may be referred to as a "guard interval (GI)."

Further, the error detection method is not limited to a CRC check.

Further, the transform method between the frequency domain and the time domain is not limited to the IFFT and FFT.

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-077502, filed on Mar. 23, 2007, Japanese Patent Application No. 2007-120853, filed on May 1, 2007, and Japanese Patent Application No. 2007-211104, filed on Aug. 13, 2007, including the specifications, drawings and abstracts, are incorporated herein by reference in their entirety.

INDUSTRIAL APPLICABILITY

The present invention is applicable to, for example, mobile communication systems.

The invention claimed is:
1. An integrated circuit for controlling a process comprising:
   allocating, to a mobile station, one or a plurality of resource block(s) of uplink, the resource blocks being consecutive in a frequency domain; and mapping a response signal to a resource of downlink, the resource being determined from an index of the allocated resource block;

wherein: the indices of a plurality of the consecutive resource blocks are respectively associated with a plurality of the resources which are different in a frequency domain; the plurality of the resources are respectively comprised of a plurality of subcarrier groups which are inconsecutive in a frequency domain; and the response signal is mapped to the subcarrier group.

2. The integrated circuit according to claim 1, further controlling a process of transmitting the mapped response signal to the mobile station.

3. The integrated circuit according to claim 1, further controlling a process of transmitting allocation information indicating the allocated resource block(s) to the mobile station.

4. The integrated circuit according to claim 1, wherein the response signal is mapped to the resource determined from an index of a resource block, which is used for a transmission in the uplink at the mobile station.

5. The integrated circuit according to claim 1, wherein the response signal is mapped to a plurality of the resources distributed in the frequency domain.

6. The integrated circuit according to claim 1, further controlling a process of spreading the response signal, wherein the spread response signal is mapped to the resource.

7. The integrated circuit according to claim 1, further controlling a process of generating a plurality of the same response signals with a repetition, wherein the plurality of the same response signals are mapped to a plurality of the resources distributed in the frequency domain, respectively.

8. The integrated circuit according to claim 1, wherein the response signal is carried on a hybrid ARQ indicator channel (HICH), and the response signal is mapped to the resource to which the hybrid ARQ indicator channel is mapped.

9. The integrated circuit according to claim 1, wherein a plurality of the response signals are mapped to the resource with code-multiplexing.

10. The integrated circuit according to claim 1, wherein the response signal is carried on a hybrid ARQ indicator channel (HICH), and a plurality of the response signals are mapped to the resource, to which a plurality of the hybrid ARQ indicator channels are mapped, with code-multiplexing.

11. The integrated circuit according to claim 1, wherein the index of the resource block is associated with the resource depending on a cell.

12. An integrated circuit for controlling a process comprising:

receiving, from a base station, allocation information indicating one or a plurality of allocated resource block(s) of uplink, the resource blocks being consecutive in a frequency domain; and determining a resource of downlink, to which a response signal transmitted from the base station is mapped, from an index of the allocated resource block based on the allocation information, wherein: the indices of a plurality of the consecutive resource blocks are respectively associated with a plurality of the resources which are different in a frequency domain; the plurality of the resources are respectively comprised of a plurality of subcarrier groups which are inconsecutive in a frequency domain; and the response signal is mapped to the subcarrier group.

13. The integrated circuit according to claim 12, further controlling a process of transmitting data using the allocated resource block(s) based on the allocation information, wherein the resource, to which the response signal is mapped, is determined from an index of the resource block used for transmitting the data.

14. The integrated circuit according to claim 12, wherein the response signal is mapped to a plurality of the resources distributed in the frequency domain.

15. The integrated circuit according to claim 12, wherein the response signal is spread in the base station, and the spread response signal is mapped to the resource.

16. The integrated circuit according to claim 12, wherein a plurality of the same response signals are generated with a repetition in the base station, and the plurality of the same response signals are mapped to a plurality of the resources distributed in the frequency domain, respectively.

17. The integrated circuit according to claim 12, wherein the response signal is carried on a hybrid ARQ indicator channel (HICH) in the base station, and the response signal is mapped to the resource to which the hybrid ARQ indicator channel is mapped.

18. The integrated circuit according to claim 12, wherein a plurality of the response signals are mapped to the resource with code-multiplexed.

19. The integrated circuit according to claim 12, wherein the response signal is carried on a hybrid ARQ indicator channel (HICH) in the base station, and a plurality of the response signals are mapped to the resource, to which a plurality of the hybrid ARQ indicator channels are mapped, with code-multiplexed.

20. The integrated circuit according to claim 12, wherein the index of the resource block is associated with the resource depending on a cell.

* * * * *

UNITED STATES PATENT AND TRADEMARK OFFICE
CERTIFICATE OF CORRECTION

PATENT NO. : 8,200,237 B2  
APPLICATION NO. : 13/271942  
DATED : June 12, 2012  
INVENTOR(S) : Masaru Fukuoka et al.

Page 1 of 1

It is certified that error appears in the above-identified patent and that said Letters Patent is hereby corrected as shown below:

Title Page: Item 75

First-named inventor Masaru Fukuoka's city of residence incorrectly reads:

"Miyagi"

and should read:

"Ishikawa"

Second-named inventor Akihiko Nishio's city of residence incorrectly reads:

"Osaka"

and should read:

"Kanagawa"

Third-named inventor Seigo Nakao's city of residence incorrectly reads:

"Osaka"

and should read:

"Kanagawa"

Signed and Sealed this  
Eighteenth Day of December, 2012

David J. Kappos  
*Director of the United States Patent and Trademark Office*

UNITED STATES PATENT AND TRADEMARK OFFICE
CERTIFICATE OF CORRECTION

PATENT NO. : 8,200,237 B2  
APPLICATION NO. : 13/271942  
DATED : June 12, 2012  
INVENTOR(S) : Masaru Fukuoka et al.

Page 1 of 1

It is certified that error appears in the above-identified patent and that said Letters Patent is hereby corrected as shown below:

Title Page: Item 75

First-named inventor Masaru Fukuoka's city of residence incorrectly reads:

"Miyagi"

and should read:

"Ishikawa"

Second-named inventor Akihiko Nishio's city of residence incorrectly reads:

"Osaka"

and should read:

"Kanagawa"

Third-named inventor Seigo Nakao's city of residence incorrectly reads:

"Osaka"

and should read:

"Kanagawa"

Fourth-named inventor Alexander Golitschek Edler Von Elbwart's city of residence incorrectly reads:

"Langen"

and should read:

"Darmstadt"

This certificate supersedes the Certificate of Correction issued December 18, 2012.

Signed and Sealed this  
Nineteenth Day of February, 2013

Teresa Stanek Rea  
*Acting Director of the United States Patent and Trademark Office*